US012248796B2

(12) United States Patent
Xu et al.

(10) Patent No.: US 12,248,796 B2
(45) Date of Patent: Mar. 11, 2025

(54) MODIFYING DIGITAL IMAGES UTILIZING A LANGUAGE GUIDED IMAGE EDITING MODEL

(71) Applicant: Adobe Inc., San Jose, CA (US)

(72) Inventors: Ning Xu, Milpitas, CA (US); Zhe Lin, Fremont, CA (US)

(73) Assignee: Adobe Inc., San Jose, CA (US)

(*) Notice: Subject to any disclaimer, the term of this patent is extended or adjusted under 35 U.S.C. 154(b) by 901 days.

(21) Appl. No.: 17/384,109

(22) Filed: Jul. 23, 2021

(65) Prior Publication Data

US 2023/0042221 A1 Feb. 9, 2023

(51) Int. Cl.
*G06F 9/451* (2018.01)
*G06F 40/20* (2020.01)
(Continued)

(52) U.S. Cl.
CPC ............. *G06F 9/453* (2018.02); *G06F 40/20* (2020.01); *G06N 3/045* (2023.01); *G06T 11/60* (2013.01);
(Continued)

(58) Field of Classification Search
CPC ........ G06F 40/166; G06F 40/20; G06F 40/30; G06F 9/453; G06N 3/0442; G06N 3/045;
(Continued)

(56) References Cited

U.S. PATENT DOCUMENTS

| 2011/0288854 A1* | 11/2011 | Glass | G06F 3/04847 |
| | | | 704/E15.04 |
| 2012/0001934 A1* | 1/2012 | Bala | H04N 1/0044 |
| | | | 715/810 |

(Continued)

FOREIGN PATENT DOCUMENTS

WO WO-2019073267 A1 * 4/2019

OTHER PUBLICATIONS

Bowen Li et al., "Controllable Text-to-Image Generation," Dec. 14, 2019, Advances in Neural Information Processing Systems 32 (NeurIPS 2019),pp. 1-9.*

(Continued)

*Primary Examiner* — Omar S Ismail
(74) *Attorney, Agent, or Firm* — Keller Preece PLLC

(57) ABSTRACT

This disclosure describes one or more implementations of systems, non-transitory computer-readable media, and methods that perform language guided digital image editing utilizing a cycle-augmentation generative-adversarial neural network (CAGAN) that is augmented using a cross-modal cyclic mechanism. For example, the disclosed systems generate an editing description network that generates language embeddings which represent image transformations applied between a digital image and a modified digital image. The disclosed systems can further train a GAN to generate modified images by providing an input image and natural language embeddings generated by the editing description network (representing various modifications to the digital image from a ground truth modified image). In some instances, the disclosed systems also utilize an image request attention approach with the GAN to generate images that include adaptive edits in different spatial locations of the image.

20 Claims, 15 Drawing Sheets

(51) Int. Cl.
  *G06N 3/045* (2023.01)
  *G06T 11/60* (2006.01)
(52) U.S. Cl.
  CPC .............. *G06T 2207/20081* (2013.01); *G06T 2207/20084* (2013.01)
(58) Field of Classification Search
  CPC .... G06N 3/0464; G06N 3/047; G06N 3/0475; G06N 3/084; G06N 3/094; G06T 11/60; G06T 2200/24; G06T 2207/20081; G06T 2207/20084
  See application file for complete search history.

(56) References Cited

U.S. PATENT DOCUMENTS

| | | | | |
|---|---|---|---|---|
| 2012/0032968 | A1* | 2/2012 | Fan | G06F 40/00 345/589 |
| 2014/0225899 | A1* | 8/2014 | Bekmambetov | G06T 13/80 345/473 |
| 2020/0053236 | A1* | 2/2020 | Tsujii | H04N 1/00403 |
| 2020/0134090 | A1* | 4/2020 | Mankovskii | G06V 10/762 |
| 2020/0334486 | A1* | 10/2020 | Joseph | G06T 5/20 |
| 2021/0035554 | A1* | 2/2021 | Iwase | G10L 15/04 |
| 2021/0073191 | A1* | 3/2021 | Hatami-Hanza | G06N 5/022 |
| 2021/0341989 | A1* | 11/2021 | Chen | G06F 3/017 |
| 2022/0005235 | A1* | 1/2022 | Gou | G06V 10/82 |
| 2022/0245109 | A1* | 8/2022 | Hatami-Hanza | G06N 7/01 |
| 2022/0399017 | A1* | 12/2022 | Xu | H04N 1/00403 |

OTHER PUBLICATIONS

Ramesh Manuvinakurike et al., "Edit me: A Corpus and a Framework for Understanding Natural Language Image Editing," May 2018, Proceedings of the Eleventh International Conference on Language Resources and Evaluation (LREC 2018), pp. 4322-4326.*
Jing Shi et al., "A Benchmark and Baseline for Language-Driven Image Editing," Nov. 2020, Proceedings of the Asian Conference on Computer Vision (ACCV), 2020, pp. 1-13.*
Ramakrishna Vedantam et al., "CIDEr: Consensus-based Image Description Evaluation," Jun. 2015, Proceedings of the IEEE Conference on Computer Vision and Pattern Recognition (CVPR), 2015, pp. 4566-4571.*
Yuanming Hu et al., "Exposure: A White-Box Photo Post-Processing Framework," May 2018, ACM Transactions on Graphics, vol. 37, No. 2, Article 26,pp. 26:1-26:16.*
Hao Tan et al., "Expressing Visual Relationships via Language," Jun. 19, 2019,mularXiv:1906.07689v2,pp. 1-9.*
Tao Xu et al., "AttnGAN: Fine-Grained Text to Image Generation with Attentional Generative Adversarial Networks," Jun. 2018, Proceedings of the IEEE Conference on Computer Vision and Pattern Recognition (CVPR), 2018, pp. 1316-1322.*
Alaaeldin El-Nouby et al., "Tell, Draw, and Repeat: Generating and Modifying Images Based on Continual Linguistic Instruction," Oct. 2018, Proceedings of the IEEE/CVF International Conference on Computer Vision (ICCV), 2019, pp. 10304-10311.*
Scott Reed, Zeynep Akata et al., "Generative Adversarial Text to Image Synthesis," Jun. 11, 2016, Proceedings of the 33 rd International Conference on Machine Learning, New York, NY, USA, 2016. JMLR: W&CP vol. 48,pp. 1-9.*
Hai Wang et al.,"Learning to Globally Edit Images with Textual Description," Oct. 13, 2018, arXiv:1810.05786v1,pp. 1-17.*
Bowen Li et al., "Lightweight Generative Adversarial Networks for Text-Guided Image Manipulation," 34th Conference on Neural Information Processing Systems (NeurIPS 2020), Vancouver, Canada,pp. 1-9*
Tingting Qiao et al., "MirrorGAN: Learning Text-to-image Generation by Redescription," Jun. 2019, Proceedings of the IEEE/CVF Conference on Computer Vision and Pattern Recognition (CVPR), 2019, pp. 1505-1510.*
Seonghyeon Nam et al.,"Text-Adaptive Generative Adversarial Networks: Manipulating Images with Natural Language, " 32nd Conference on Neural Information Processing Systems (NeurIPS 2018), Montréal, Canada,pp. 1-8.*
Wenbo Li et al., "Object-driven Text-to-Image Synthesis via Adversarial Training," Jun. 2019, Proceedings of the IEEE/CVF Conference on Computer Vision and Pattern Recognition (CVPR), 2019, pp. 12174-12181.*
Bowen Li et al., "ManiGAN: Text-Guided Image Manipulation," Jun. 2020, Proceedings of the IEEE/CVF Conference on Computer Vision and Pattern Recognition (CVPR), 2020, pp. 7880-7887.*
Satanjeev Banerjee and Alon Lavie. Meteor: An automatic metric for mt evaluation with improved correlation with human judgments. In Proceedings of the acl workshop on intrinsic and extrinsic evaluation measures for machine translation and/or summarization, pp. 65-72, 2005.
Madimir Bychkovsky, Sylvain Paris, Eric Chan, and Fredo Durand. Learning photographic global tonal adjustment with a database of input / output image pairs. In The Twenty-Fourth IEEE Conference on Computer Vision and Pattern Recognition, 2011.
Yunjey Choi, Minje Choi, Munyoung Kim, Jung-Woo Ha, Sunghun Kim, and Jaegul Choo. Stargan: Unified generative adversarial networks for multi-domain image-to-image translation. In Proceedings of the IEEE conference on computer vision and pattern recognition, pp. 8789-8797, 2018.
Hao Dong, Simiao Yu, Chao Wu, and Yike Guo. Semantic image synthesis via adversarial learning. In Proceedings of the IEEE International Conference on Computer Vision, pp. 5706-5714, 2017.
Alaaeldin El-Nouby, Shikhar Sharma, Hannes Schulz, De- von Hjelm, Layla El Asri, Samira Ebrahimi Kahou, Yoshua Bengio, and Graham W Taylor. Tell, draw, and repeat: Generating and modifying images based on continual linguistic instruction. In Proceedings of the IEEE International Conference on Computer Vision, pp. 10304-10312, 2019.
Chen Gao, Yunpeng Chen, Si Liu, Zhenxiong Tan, and Shuicheng Yan. Adversarialnas: Adversarial neural architecture search for gans. In Proceedings of the IEEE/CVF Conference on Computer Vision and Pattern Recognition, pp. 5680-5689, 2020.
Ian Goodfellow, Jean Pouget-Abadie, Mehdi Mirza, Bing Xu, David Warde-Farley, Sherjil Ozair, Aaron Courville, and Yoshua Bengio. Generative adversarial nets. In Advances in neural information processing systems, pp. 2672-2680, 2014.
Kaiming He, Xiangyu Zhang, Shaoqing Ren, and Jian Sun. Deep residual learning for image recognition. In Proceedings of the IEEE conference on computer vision and pattern recognition, pp. 770-778, 2016.
Yuanming Hu, Hao He, Chenxi Xu, Baoyuan Wang, and Stephen Lin. Exposure: A white-box photo post-processing framework. ACM Transactions on Graphics (TOG), 37(2):1-17, 2018.
Phillip Isola, Jun-Yan Zhu, Tinghui Zhou, and Alexei A Efros. Image-to-image translation with conditional adversarial networks. In Proceedings of the IEEE conference on computer vision and pattern recognition, pp. 1125-1134, 2017.
Bowen Li, Xiaojuan Qi, Thomas Lukasiewicz, and Philip HS Torr. Manigan: Text-guided image manipulation. In Proceedings of the IEEE/CVF Conference on Computer Vision and Pattern Recognition, pp. 7880-7889, 2020.
Wenbo Li, Pengchuan Zhang, Lei Zhang, Qiuyuan Huang, Xiaodong He, Siwei Lyu, and Jianfeng Gao. Object-driven text-to-image synthesis via adversarial training. In Proceedings of the IEEE Conference on Computer Vision and Pattern Recognition, pp. 12174-12182, 2019.
Chin-Yew Lin. Rouge: A package for automatic evaluation of summaries. InText summarization branches out, pp. 74-81, 2004.
Ramesh Manuvinakurike, Jacqueline Brixey, Trung Bui, Walter Chang, Doo Soon Kim, Ron Artstein, and Kallirroi Georgila. Edit me: A corpus and a framework for understanding natural language image editing. In Proceedings of the Eleventh International Conference on Language Resources and Evaluation (LREC 2018), 2018.
Mehdi Mirza and Simon Osindero. Conditional generative adversarial nets.arXiv preprint arXiv:1411.1784, 2014.

(56) References Cited

OTHER PUBLICATIONS

Seonghyeon Nam, Yunji Kim, and Seon Joo Kim. Text-adaptive generative adversarial networks: Manipulating images with natural language. In Advances in neural information processing systems, pp. 42-51, 2018.

Kishore Papineni, Salim Roukos, Todd Ward, and Wei-Jing Zhu. Bleu: a method for automatic evaluation of machine translation. In Proceedings of the 40th annual meeting of the Association for Computational Linguistics, pp. 311-318, 2002.

Jongchan Park, Joon-Young Lee, Donggeun Yoo, and In So Kweon. Distort-and-recover: Color enhancement using deep reinforcement learning. In Proceedings of the IEEE Conference on Computer Vision and Pattern Recognition, pp. 5928-5936, 2018.

Taesung Park, Ming-Yu Liu, Ting-Chun Wang, and Jun-Yan Zhu. Semantic image synthesis with spatially-adaptive normalization. In Proceedings of the IEEE Conference on Computer Vision and Pattern Recognition, pp. 2337-2346, 2019.

Tingting Qiao, Jing Zhang, Duanqing Xu, and Dacheng Tao. Mirrorgan: Learning text-to-image generation by redescription. In Proceedings of the IEEE/CVF Conference on Computer Vision and Pattern Recognition, pp. 1505-1514, 2019.

Scott Reed, Zeynep Akata, Xinchen Yan, Lajanugen Logeswaran, Bernt Schiele, and Honglak Lee. Generative adversarial text to image synthesis.arXiv preprint arXiv:1605.05396, 2016.

Jing Shi, Ning Xu, Trung Bui, Franck Dernoncourt, Zheng Wen, and Chenliang Xu. A benchmark and baseline for language-driven image editing.arXiv preprint arXiv:2010.02330, 2020 part 1.

Jing Shi, Ning Xu, Trung Bui, Franck Dernoncourt, Zheng Wen, and Chenliang Xu. A benchmark and baseline for language-driven image editing.arXiv preprint arXiv:2010.02330, 2020 part 2.

Hao Tan, Franck Dernoncourt, Zhe Lin, Trung Bui, and Mohit Bansal. Expressing visual relationships via language. In Proceedings of the 57th Annual Meeting of the Association for Computational Linguistics, pp. 1873-1883, 2019.

Ramakrishna Vedantam, C Lawrence Zitnick, and Devi Parikh. Cider: Consensus-based image description evaluation. In Proceedings of the IEEE conference on computer vision and pattern recognition, pp. 4566-4575, 2015.

Hai Wang, Jason D Williams, and SingBing Kang. Learning to globally edit images with textual description.arXiv preprint arXiv:1810.05786, 2018.

Tao Xu, Pengchuan Zhang, Qiuyuan Huang, Han Zhang, Zhe Gan, Xiaolei Huang, and Xiaodong He. Attngan: Fine-grained text to image generation with attentional generative adversarial networks. In Proceedings of the IEEE conference on computer vision and pattern recognition, pp. 1316-1324, 2018.

Han Zhang, Tao Xu, Hongsheng Li, Shaoting Zhang, Xiao-gang Wang, Xiaolei Huang, and Dimitris N Metaxas. Stackgan: Text to photo-realistic image synthesis with stacked generative adversarial networks. In Proceedings of the IEEE international conference on computer vision, pp. 5907-5915, 2017.

Han Zhang, Tao Xu, Hongsheng Li, Shaoting Zhang, Xiao-gang Wang, Xiaolei Huang, and Dimitris N Metaxas. Stack-gan++: Realistic image synthesis with stacked generative adversarial networks. IEEE transactions on pattern analysis and machine intelligence, 41(8):1947-1962, 2018 part 1.

Han Zhang, Tao Xu, Hongsheng Li, Shaoting Zhang, Xiao-gang Wang, Xiaolei Huang, and Dimitris N Metaxas. Stack-gan++: Realistic image synthesis with stacked generative adversarial networks. IEEE transactions on pattern analysis and machine intelligence, 41(8):1947-1962, 2018 part 2.

Han Zhang, Tao Xu, Hongsheng Li, Shaoting Zhang, Xiao-gang Wang, Xiaolei Huang, and Dimitris N Metaxas. Stack-gan++: Realistic image synthesis with stacked generative adversarial networks. IEEE transactions on pattern analysis and machine intelligence, 41(8):1947-1962, 2018 part 3.

Jun-Yan Zhu, Taesung Park, Phillip Isola, and Alexei A Efros. Unpaired image-to-image translation using cycle-consistent adversarial networks. In Proceedings of the IEEE international conference on computer vision, pp. 2223-2232, 2017.

Zhen Zhu, Tengteng Huang, Baoguang Shi, Miao Yu, Bofei Wang, and Xiang Bai. Progressive pose attention transfer for person image generation. In Proceedings of the IEEE Conference on Computer Vision and Pattern Recognition, pp. 2347-2356, 2019.

\* cited by examiner

Fig. 9

MODIFYING DIGITAL IMAGES UTILIZING A LANGUAGE GUIDED IMAGE EDITING MODEL

BACKGROUND

In recent years, mobile devices are increasingly utilized to capture images and subsequently modify the images using editing tools. To illustrate, images are often modified utilizing image editing programs (or applications) within mobile devices. Some conventional systems further enable image modification through language-based commands to provide a user-friendly editing experience on mobile devices. Although these conventional systems make modifications via language-based commands, these systems suffer from several technical shortcomings. For example, conventional systems often fail to accurately modify images utilizing language-based commands and also fail to easily utilize a wide variety of language-based commands on a wide variety of real-world images to generate accurate edits to the images.

SUMMARY

This disclosure describes one or more embodiments of systems, non-transitory computer-readable media, and methods that solve one or more of the foregoing problems in addition to providing other benefits. In particular, the disclosed systems perform language guided digital image editing utilizing a cycle-augmentation generative-adversarial neural network (CAGAN) that is augmented using a cross-modal cyclic mechanism. For instance, the disclosed systems generate an editing description network that generates language embeddings which represent image transformations applied between an input digital image and a modified digital image. In one or more embodiments, the editing description network is trained utilizing an input image and a modified image generated by a generative adversarial neural network (GAN) based on the input digital image and a natural language embedding. Furthermore, the disclosed systems further train the GAN to generate modified images by providing an input image and natural language embeddings generated by the editing description network (representing various modifications to the digital image via random modification or swapping). In some embodiments, the disclosed systems also utilize an image request attention approach with the GAN to generate images that include adaptive edits in different spatial locations of the image.

BRIEF DESCRIPTION OF THE DRAWINGS

The detailed description is described with reference to the accompanying drawings in which:

FIG. 9 illustrates comparisons of generating modified images utilizing existing language-guided global editing methods and a language-guided image-editing system in accordance with one or more implementations.

DETAILED DESCRIPTION

Figure 1:
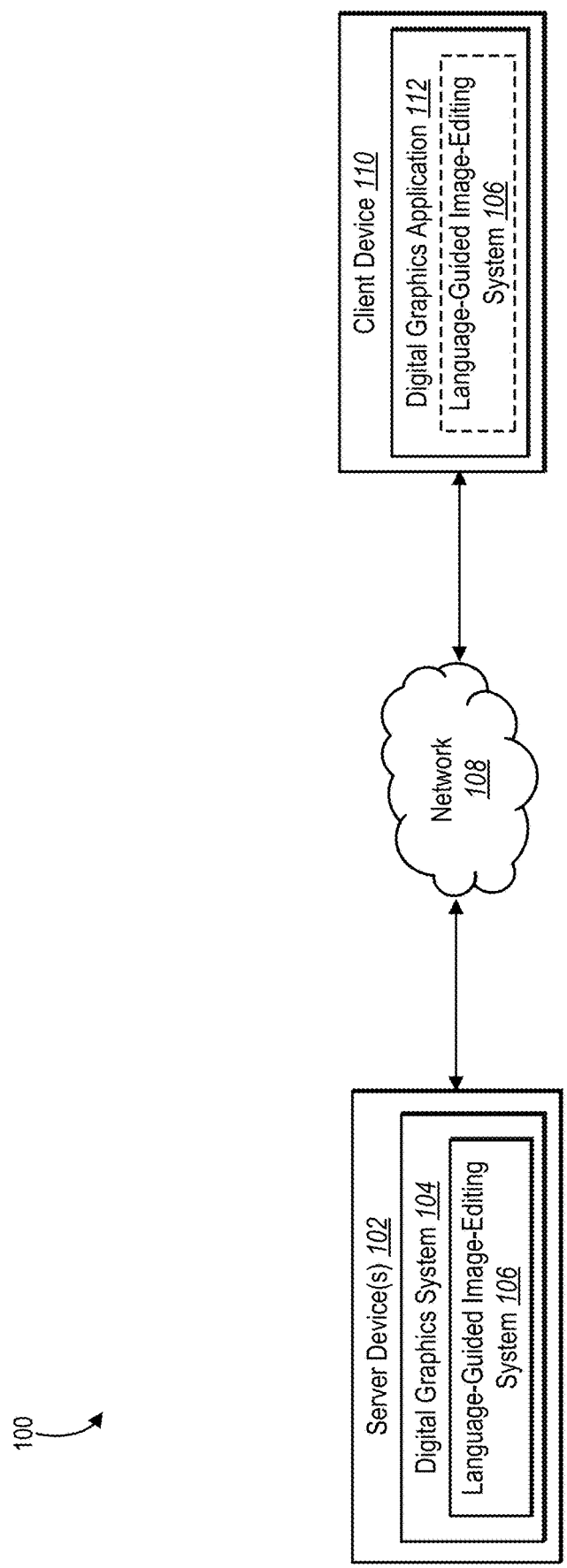
FIG. 1 illustrates a schematic diagram of an example system in which a language-guided image-editing system operates in accordance with one or more implementations.

One or more embodiments of a language-guided image-editing system generates modified digital images based on natural language modification requests utilizing a cycle-augmentation generative-adversarial neural network (CAGAN). For instance, the language-guided image-editing system utilizes a GAN trained utilizing a cyclic mechanism having multiple variations of a training image and an editing description network that outputs natural language embeddings representing visual changes between the training image and the multiple variations of the training image. Indeed, in some embodiments, the language-guided image-editing system utilizes the cyclically trained GAN to modify an image based on a natural language modification request for the image (e.g., text-based request, voice-based request). Furthermore, in certain instances, the language-guided image-editing system utilizes the cyclically trained GAN with an attention algorithm that calculates a degree of editing in a spatial dimension for the image to adaptively edit the image in different spatial locations.

As an overview, in one or more embodiments, the language-guided image-editing system receives a natural language modification request from a device (e.g., as text input or voice input) in relation to an image (e.g., "brighten the image," "decrease exposure and increase contrast," "remove green tint"). Subsequently, in one or more instances, the language-guided image-editing system utilizes a natural language embedding from the modification request and the image with a CAGAN to generate a modified image that reflects the modification request within the image. In addition, in one or more embodiments, the language-guided image-editing system generates the modified image to have different degrees of editing at different spatial locations within the image (e.g., brightening a foreground object depicted within an image while visually maintaining the background).

In one or more embodiments, to train the CAGAN to accurately and easily generate image modifications based on natural language modification requests, the language-guided image-editing system utilizes an editing description network. In particular, in some embodiments, the language-guided image-editing system utilizes a GAN with an input image and an input natural language embedding for a visual modification request to generate a modified image that reflects modifications to the input image based on the modification request. Subsequently, in one or more embodiments, the language-guided image-editing system utilizes the editing description network with the input image and the modified image to generate an additional natural language embedding that represents (or describes) the visual changes between the two images. Furthermore, in certain instances, the language-guided image-editing system determines a loss between the input natural language embedding and the additional natural language embedding. For example, the language-guided image-editing system utilizes the loss to learn parameters of the editing description network such that the editing description network generates accurate natural language embedding modification requests that describe changes between images.

Additionally, in one or more embodiments, the language-guided image-editing system trains the GAN to generate modified images that depict accurate modifications to images based on natural language modification requests utilizing the editing description network with an augmented training dataset. In particular, in one or more embodiments, the language-guided image-editing system generates an augmented training dataset by generating variations of an image. Indeed, in certain instances, the language-guided image-editing system utilizes variations of an image by swapping images with modified images and/or by randomly modifying images.

Then, in certain instances, the language-guided image-editing system utilizes the editing description network to generate natural language embeddings based on the image and the variations of the image. Upon generating the natural language embeddings, in one or more embodiments, the language-guided image-editing system utilizes the natural language embeddings and the image with the GAN to generate modified images that reflect the modification requests of the natural language embeddings. In some embodiments, these modified images are compared, by the language guided image editing system, to the variations of the image to determine losses that are utilized to learn parameters of the GAN.

Additionally, in some embodiments, the language-guided image-editing system utilizes an attention algorithm that calculates a degree of editing in a spatial dimension for the image to adaptively edit the image in different spatial locations. For example, the language-guided image-editing system calculates an attention (e.g., an attention matrix) between embeddings of language-based modification requests and visual feature maps of an image to determine a degree of editing in different spatial locations of an image. In some embodiments, the language-guided image-editing system utilizes an attention algorithm that is learned, with supervision using ground truth images that are spatial-adaptive edited, to assign an appropriate degree of editing for each location of an image. As an example, the language-guided image-editing system utilizes the attention algorithm to brighten locations within an image that are dark and to avoid lighting already bright places in the image when the modification request is "brighten the image," instead of brightening the image globally.

As suggested above, many conventional systems fail to accurately modify images utilizing language-based commands. To illustrate, many conventional systems fail to accurately understand language-based modification commands. This often results in image modifications that are erroneous in relation to the modifications requested in the language-based modification commands. Oftentimes, due to imbalances in training data, conventional systems modify images in opposite to a requested modification (e.g., brightening an image when a decrease in brightness is requested, over saturating an image when a decrease in saturation is requested). Many conventional systems also fail to carry out a modification (or editing operation) when the modification command is not recognized by the conventional systems. These inaccuracies often result from conventional systems utilizing imbalanced and insufficient training data distributions that focus on editing operations that are more frequently requested.

In addition to being inaccurate, many conventional systems are also inflexible. As an example, many conventional systems map language-based modification commands to a sequence of executable editing operations. As a result, such conventional systems require predefined editing operations that rigidly map to specific types of language-based commands. For example, in some cases, conventional systems utilize template text inputs to map modification commands to predefined editing operations. Conventional systems that utilize template text inputs often fail to recognize and/or perform a wide variety of visual modification commands.

Furthermore, conventional systems often fail to easily perform accurate modifications on real-world images using language-based modification commands. For instance, many conventional systems are only capable of performing modifications utilizing language-based modification commands on simple and/or singular objects that are similar to a domain of objects captured by a limited set of training data. As such, these conventional systems are often incapable of using language-based modification commands to modify digital images that depict real-world scenes that may have complex and/or multiple objects.

In addition, many conventional systems also cannot easily perform editing operations that account for differences in different regions of the image. For example, conventional systems oftentimes apply editing operations globally in response to a language-based modification command that may be vague (e.g., "brighten the image," "reduce the contrast"). In many instances, by rigidly applying editing operations from language-based modification commands uniformly (globally) to the image (e.g., increasing exposure of the entire image, increasing saturation of the entire image), conventional systems often create modified images that have unsatisfactory results (e.g., overexposed regions within an image, over-saturated regions within the image).

The disclosed language-guided image-editing system provides a number of advantages over conventional systems. For example, the language-guided image-editing system generates modified images that include modifications that are accurate and true to natural language-based modification requests. In particular, in one or more embodiments, the language-guided image-editing system utilizes an editing description network to augment training data such that the CAGAN learns to understand a variety of modification requests and accurately performs modifications even when the requested modification is uncommon (e.g., not significantly represented in training data).

Furthermore, unlike conventional systems, the language-guided image-editing system does not rigidly rely on mapped and/or template-based language-based requests. In contrast, the language-guided image-editing system machine learns natural language requests and responds with appropriate editing operations in an image. For instance, the language-guided image-editing system utilizes the editing description network to generate training natural language embeddings that mimic real-world natural language requests to train the CAGAN to recognize and accurately process a wide variety of non-template language-based requests (e.g., natural spoken language requests). Accordingly, in one or more embodiments, the language-guided image-editing system flexibly receives a variety of natural language requests and performs appropriate editing operations to an image based on the natural language requests.

In addition, in one or more embodiments, the language-guided image-editing system easily performs accurate modifications on real-world images in response to natural language-based requests. In one or more embodiments, the CAGAN is trained using a cyclic mechanism having a dynamic range of training images with different modifications and scene complexity and accompanying natural-language embeddings generated from the editing description network. As such, unlike many conventional systems, the language guided image editing system, in one or more embodiments, easily and accurately performs modifications on images that depict complex scenes (e.g., not only simple objects and/or singular objects related to a domain of training images). For instance, this allows the language-guided image-editing system to utilize the CAGAN for random images (e.g., of real-world scenes) and random language-based requests from mobile devices.

Furthermore, in contrast to conventional systems that rigidly perform editing operations globally in response to a natural language-based modification request, the language guided image editing system, in one or more embodiments, performs editing operations differently across various regions of an image even when the natural language-based modification request is vague (or unclear). For example, the language-guided image-editing system utilizes the above-mentioned attention algorithm to calculate different degrees of editing in different spatial locations of an image such that a global editing operation is applied differently across the different spatial locations. As such, even when a language-based modification request is vague (e.g., "brighten the image," "lower the contrast"), the language-guided image-editing system calculates an attention within the image to generate a modified image that applies different amounts of modifications in different regions (e.g., brightening a foreground while maintaining a background brightness) to create modified images that satisfactorily include edits (e.g., no overexposed regions within an image, no over-saturation within the image).

Turning now to the figures, FIG. 1 illustrates a schematic diagram of one embodiment of a system 100 (or environment) in which a language-guided image-editing system 106 operates in accordance with one or more embodiments. As illustrated in FIG. 1, the system 100 includes server device(s) 102, a network 108, and a client device 110. As further illustrated in FIG. 1, the server device(s) 102 and the client device 110 communicate via the network 108.

As shown in FIG. 1, the server device(s) 102 include a digital graphics system 104 which further includes the language-guided image-editing system 106. For instance, the server device(s) 102 includes, but is not limited to, a computing (or computer) device (as explained below with reference to FIG. 13). In one or more embodiments, the language-guided image-editing system 106 receives an image and a natural language text (e.g., from a voice input or keyboard input) describing a modification request.

The language-guided image-editing system 106 utilizes a cycle-augmentation generative-adversarial neural network to generate a modified image based on the image and natural language text. In some implementations, the cycle-augmentation generative-adversarial neural network is trained utilizing a cyclic loop including multiple variations of training images and an editing description network that outputs natural language embeddings representative of the visual changes between images (e.g., the training images and variations of the training images). Furthermore, in one or more embodiments, the language-guided image-editing system 106 utilizes the cyclically trained GAN with an attention algorithm that calculates a degree of editing in a spatial dimension for the image to generate a modified image that includes adaptive edits in different spatial locations of the image.

Furthermore, as shown in FIG. 1, the system 100 includes the client device 110. In some embodiments, the client device 110 includes, but is not limited to, a mobile device (e.g., smartphone, tablet), a laptop, a desktop, or any other type of computing device, including those explained below with reference to FIG. 13. In one or more embodiments, although not shown in FIG. 1, the client device 110 is operated by a user to perform a variety of functions (e.g., via a digital graphics application 112). For example, the client device 110 performs functions such as, but not limited to, capturing and storing images (or videos), displaying images (or other content), and modifying (or editing) the images (or videos).

To illustrate, in some instances, the client device 110 displays an image and receives a natural language text describing a modification request via a voice input. Then, the client device 110 provides the image and the natural language text describing the modification request to the language-guided image-editing system 106 (e.g., by communicating with the server device(s) 102). In one or more implementations, the language-guided image-editing system 106 generates a modified image based on the image and the natural language text and, provides for display on the client device 110, the modified image.

To access the functionalities of the language-guided image-editing system 106 (as described above), in some implementations, a user interacts with the digital graphics application 112 on the client device 110. For instance, the digital graphics application 112 includes one or more software applications (e.g., to display or modify an image in accordance with one or more embodiments herein) installed on the client device 110. In certain instances, the digital graphics application 112 is hosted on the server device(s) 102. In addition, when hosted on the server device(s), the digital graphics application 112 is accessed by the client device 110 through a web browser and/or another online interfacing platform and/or tool.

In some implementations, the language-guided image-editing system 106 on the server device(s) 102 supports the language-guided image-editing system 106 on the client device 110. For instance, the language-guided image-editing system 106 on the server device(s) 102 learns parameters for one or more neural networks (e.g., Cycle Augmented Generative Adversarial Neural Network). The language-guided image-editing system 106 then, via the server device(s) 102, provides the trained neural network to the client device 110. In other words, the client device 110 obtains (e.g., downloads) the language-guided image-editing system 106 with one or more neural network with the learned parameters from the server device(s) 102. Once downloaded, the language-guided image-editing system 106 on the client device 110 utilizes the language-guided image-editing system 106 to generate modified digital images in accordance with natural language requests independent from the server device(s) 102.

In alternative implementations, the language-guided image-editing system 106 includes a web hosting application that allows the client device 110 to interact with content and services hosted on the server device(s) 102. To illustrate, in one or more implementations, the client device 110 accesses a web page supported by the server device(s) 102. The client device 110 provides a digital image and a natural language request to the server device(s) 102, and, in response, the language-guided image-editing system 106 on the server device(s) 102 generates a modified digital image in accordance with the natural language request. The server device(s) 102 then provides the modified digital image to the client device 110 for display or further editing.

Indeed, the language-guided image-editing system 106 can be implemented in whole, or in part, by the individual elements of the system 100. Indeed, although FIG. 1 illustrates the language-guided image-editing system 106 implemented with regard to the server device(s) 102, different components of the language-guided image-editing system 106 can be implemented by a variety of devices within the system 100.

Additionally, as shown in FIG. 1, the system 100 includes the network 108. As mentioned above, in some embodiments, the network 108 enables communication between components of the system 100. In certain embodiments, the network 108 includes a suitable network and may communicate using any communication platforms and technologies suitable for transporting data and/or communication signals, examples of which are described with reference to FIG. 13. Furthermore, although FIG. 1 illustrates the server device(s) 102 and the client devices 110 communicating via the network 108, in certain embodiments, the various components of the system 100 communicate and/or interact via other methods (e.g., the server device(s) 102 and the client device 110 communicating directly).

Figure 2A:
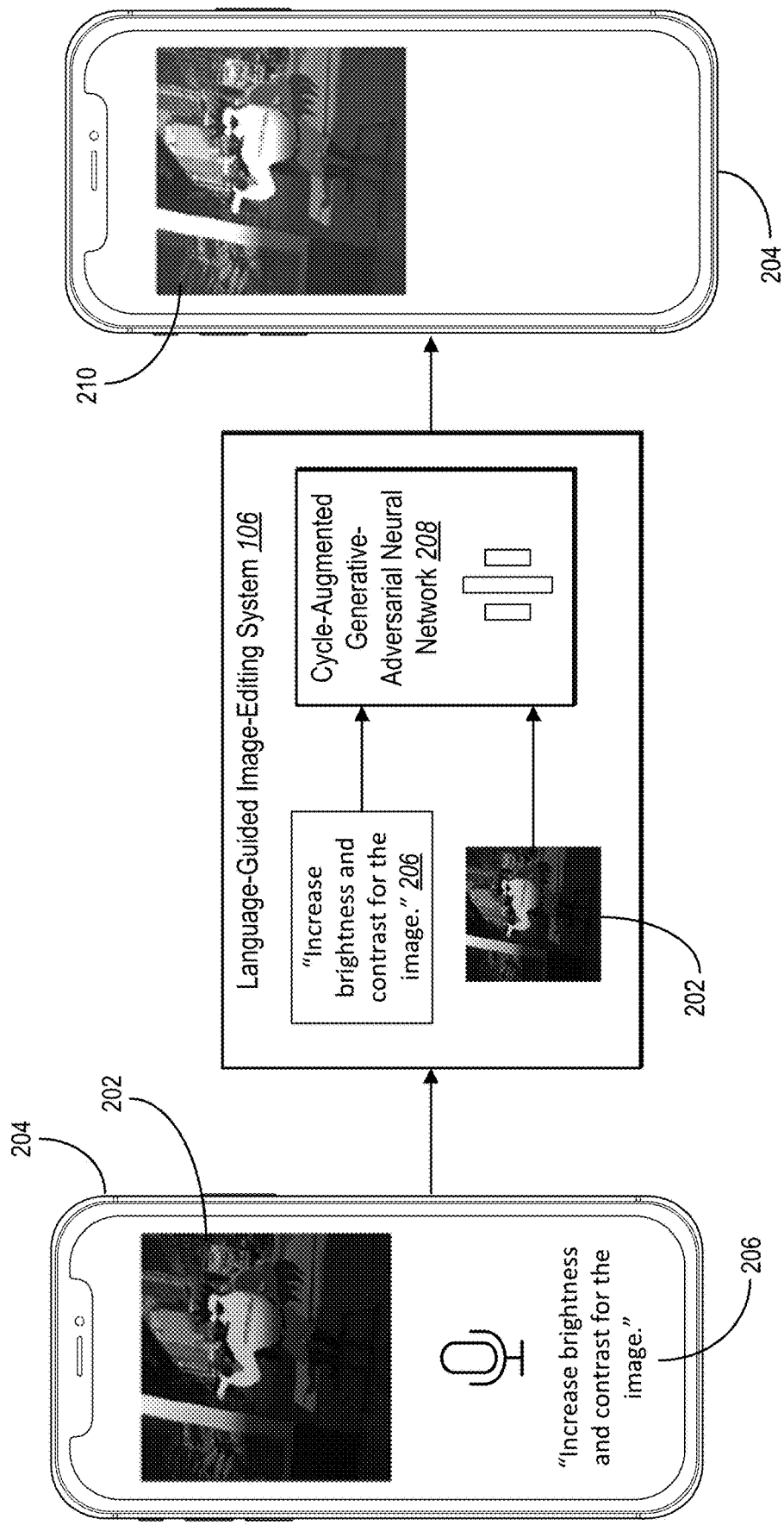
FIGS. 2A and 2B illustrate a language-guided image-editing system generating modified images based on an image and a natural language modification request in accordance with one or more implementations.

As previously mentioned, in one or more embodiments, the language-guided image-editing system 106 generates modified images based on natural language modification requests utilizing a CAGAN. Indeed, FIG. 2A illustrates an example of the language-guided image-editing system 106 generating a modified image based on an image and a natural language text describing a modification request. As shown in FIG. 2A, the language-guided image-editing system 106 receives an image 202 displayed within a client device 204. As further shown in FIG. 2A, the language-guided image-editing system 106 also receives a natural language text 206 (e.g., via a voice input) from the client device 204.

A natural language (or linguistic) text includes a data representation of an element of speech or writing. In some embodiments, natural language text includes digital input (e.g., via typing, speech-to-text applications, or writing through a touchscreen or stylus) that represents speech or writing in a variety of languages as a form of communication. For example, natural language text includes user spoken, typed, or otherwise inputted digital data that communicates and/or describes a visual modification request in relation to an image.

A digital image (sometimes referred to as an image) includes a digital symbol, picture, icon, and/or other visual illustration depicting one or more objects. For instance, an image includes a digital file having a visual illustration and/or depiction of an object (e.g., human, place, or thing). Indeed, in some implementations, an image includes, but is not limited to, a digital file with the following extensions: JPEG, TIFF, BMP, PNG, RAW, or PDF. In some instances, an image includes a frame from a digital video file having an extension such as, but not limited to the following extensions: MP4, MOV, WMV, or AVI. In addition, as used in this disclosure, a variation of a digital image includes an additional version of the digital image that is generated (or obtained) through modifications (e.g., particular editing operations, random editing operations) and/or by swapping an original image with a later obtained image through modification. In one or more embodiments, the language guided image editing system utilizes variations of digital images to augment training data available to train a GAN to generate modified images based on input natural language embeddings in accordance with one or more embodiments herein.

A visual modification request includes an instruction and/or command to perform an editing operation on an image. For example, a visual modification request includes a natural language text instruction or command that specifies one or more editing operations (e.g., brightness, hue, tone, saturation, contrast, exposure, removal), one or more adjustment types (e.g., increase, decrease, change, set), and/or one or more degrees of adjustments (e.g., a lot, a little, a numerical value). To illustrate, in one or more embodiments, a natural language text that describes a visual modification request includes text such as, but not limited to, "decrease the brightness a lot," "increase the contrast," "use a warmer tone," "increase the exposure by 10 percent."

As illustrated in FIG. 2A, the language-guided image-editing system 106 utilizes a cycle augmented generative adversarial neural network 208 (in accordance with one or more embodiments herein) with the natural language text 206 (e.g., a visual modification request to "increase brightness and contrast for the image") and the image 202 to generate the modified image 210 (e.g., for display within the client device 204). As shown in FIG. 2A, the language-guided image-editing system 106 utilizes the cycle augmented generative adversarial neural network 208 to generate a modified image that reflects the modification request from the natural language text 206 within the image 202. Indeed, as illustrated in FIG. 2A, the modified image 210 depicts a higher brightness and contrast in comparison to the image 202.

A neural network includes a machine learning model that can be tuned (e.g., trained) based on training input to approximate unknown functions. For example, a neural network includes a model of interconnected digital neurons that communicate and learn to approximate complex functions and generate outputs based on a plurality of inputs provided to the model. For instance, a neural network includes one or more machine learning algorithms such as, but not limited to, deep convolutional neural networks (CNN) and recurrent neural networks (RNN).

More particularly, a generative adversarial neural network (GAN) includes a neural network that generates (photorealistic) images depicting a person or another scene (e.g., objects, landscapes, persons within real-world environments). In some embodiments, a GAN encodes images into a latent vector space and decodes (or converts) latent vectors from the latent vector space to synthesize (photorealistic) images based on a signal (e.g., random noise, an image, natural language text, natural language embeddings). For example, a GAN utilizes an image and a natural language embedding describing a modification request to generate a modified digital image that depicts the scene from image with visual changes (or modifications) as described in the natural language embedding. In one or more embodiments, the language guided image editing system utilizes a GAN based on a variety of neural network models such as, but not limited to, an unconditional GAN, a Deep Convolutional GAN (DCGAN), a text-to-image GAN, CycleGAN, and/or a conditional GAN (cGAN).

Figure 2B:
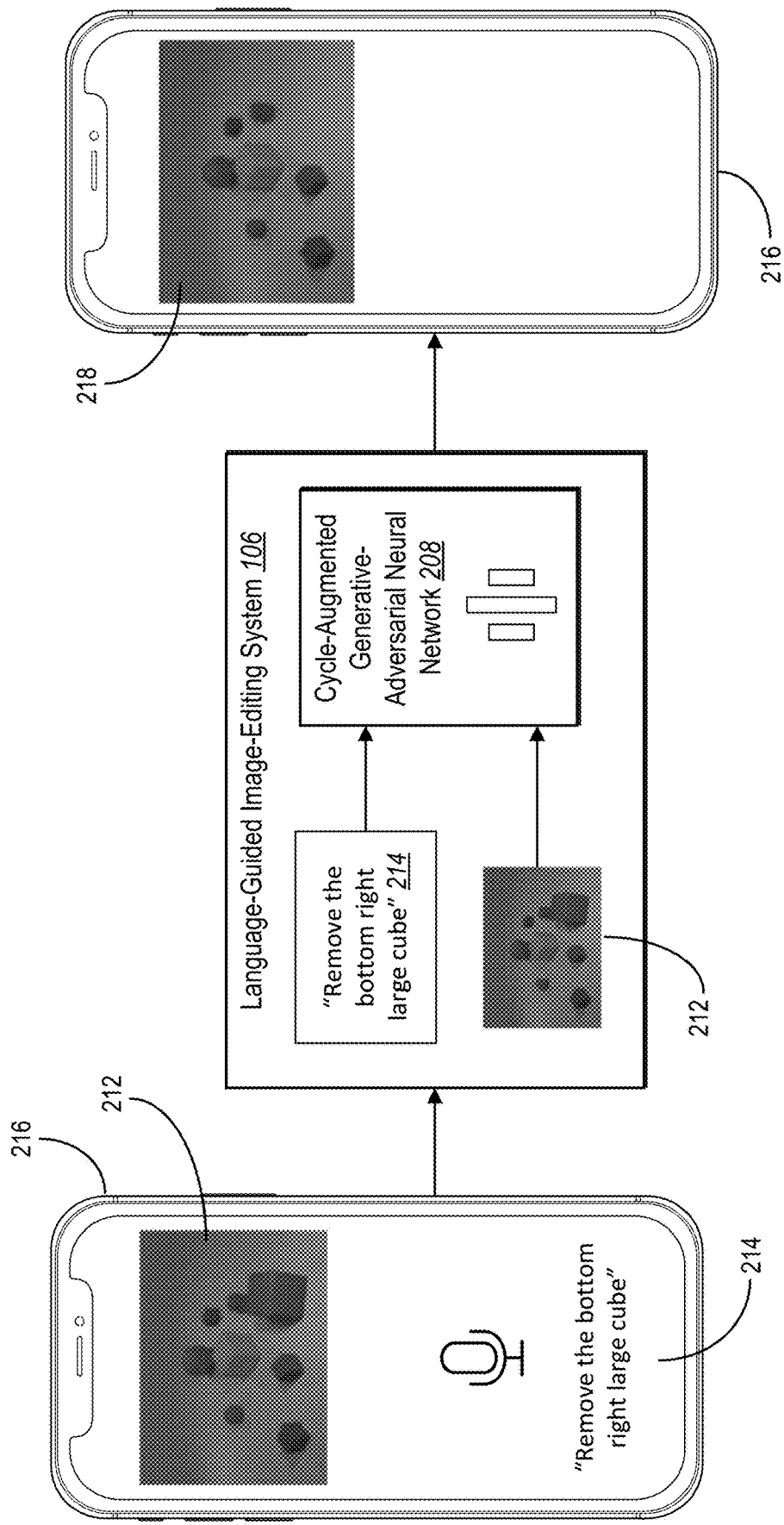

As another example, FIG. 2B illustrates the language-guided image-editing system 106 generating another modified image based on an image and a natural language text describing a modification request. As shown in FIG. 2B, the language-guided image-editing system 106 receives an image 212 and a natural language text 214 (e.g., "remove the bottom right large cube") from the client device 216. In response, as shown in FIG. 2B, the language-guided image-editing system 106 utilizes the image 212 and the natural language text 214 with the cycle augmented generative adversarial neural network 208 (in accordance with one or more embodiments herein) to generate a modified image 218 (for display within the client device 216). Indeed, as shown in FIG. 2B, the modified image 218 depicts the image 212 without the bottom right large cube depicted within the image 212 (as requested in the natural language text 214).

Although FIGS. 2A and 2B illustrate particular editing operations, the language-guided image-editing system 106, in one or more embodiments, utilizes the CAGAN to generate various modified digital images having various types of modifications based on a linguistic request (e.g., voice and/or text-based). For example, based on a given natural language text description of a modification request, the language-guided image-editing system 106 utilizes the CAGAN to generate a modified digital image to reflect the described modification request for an image. Indeed, in one or more embodiments, the language-guided image-editing system 106 utilizes the CAGAN to generate modified images having various combinations and degrees of edits from various editing operations (as described above).

As previously mentioned, the language-guided image-editing system 106 utilizes an editing description neural network for cyclic and data augmented training of the CAGAN. In some embodiments, the language-guided image-editing system 106 utilizes an editing description neural network that generates natural language embeddings that describe (or represent) visual changes between a pair of images. Additionally, in one or more embodiments, the language-guided image-editing system 106 learns parameters for the editing description neural network based on losses between natural language embeddings generated by the editing description neural network for a modified image and a natural language embedding utilized to generate the modified image (from a CAGAN).

A natural language embedding includes a representation of a natural language text within a multi-dimensional space. In particular, in one or more embodiments, a natural language embedding includes a set of numerical values that represent one or more attributes or characteristics (or categories) of text (or words formed by the text) as dimensions in a multi-dimensional space. In some embodiments, the language guided image editing system utilizes a deep learning model to encode (or embed) a natural language text within a multi-dimensional space as a natural language embedding. Furthermore, in some implementations, natural language embedding of natural language text are utilized by the language guided image editing system to classify the text within the higher multi-dimensional space. For example, the language guided image editing system utilizes a deep learning model such as, but not limited to, a recurrent neural network to generate natural language embeddings from natural language texts. In certain implementations, the language guided image editing system utilizes a recurrent neural network such as a long short-term memory (LSTM) network and/or a bilateral LSTM (biLSTM).

An editing description network includes a machine learning model that generates natural language embeddings that describe editing operations between a pair of images. In particular, in one or more embodiments, the editing description network models editing operations (or identifies visual changes) between an image and a modified version of the image to generate natural language embeddings that represent the visual changes between the images (e.g., an editing description). In one or more embodiments, the language guided image editing system utilizes the editing description network with a pair of images to obtain a natural language embedding that describes the visual changes between the pair of images. In some instances, the language guided image editing system utilizes an editing description network based on a variety of machine learning models such as, but not limited to, a convolutional neural network and/or a residual convolutional neural network (e.g., ResNet having various numbers of layers).

Figure 3:
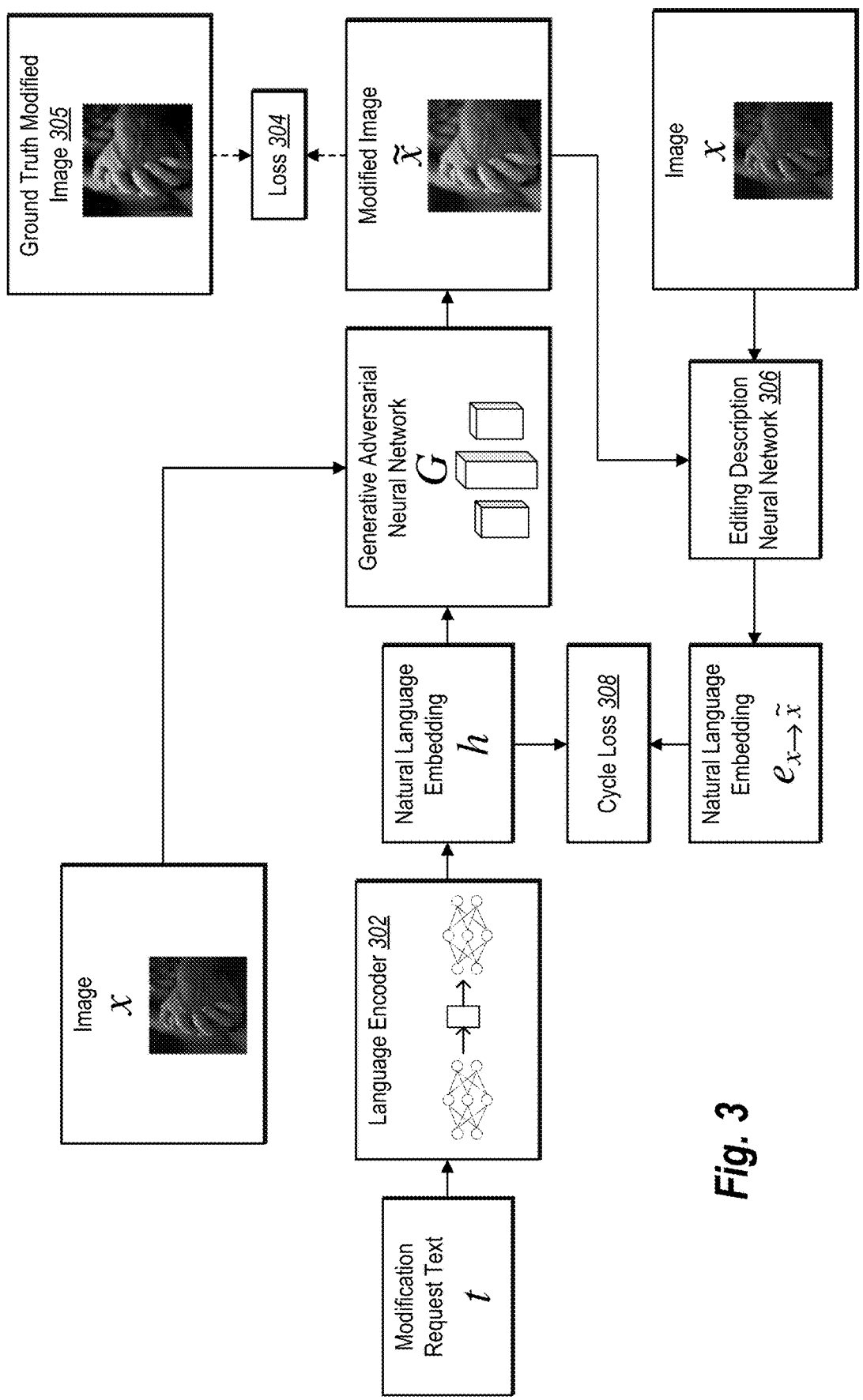
FIG. 3 illustrates a language-guided image-editing system learning parameters of an editing description neural network in accordance with one or more implementations.

For example, FIG. 3 illustrates the language-guided image-editing system 106 learning parameters of an editing description neural network. As shown in FIG. 3, the language-guided image-editing system 106 utilizes a language encoder 302 with a modification request text t (e.g., natural language text) to generate a natural language embedding h. Then, as shown in FIG. 3, the language-guided image-editing system 106 utilizes an image x and the natural language embedding h with the generative adversarial neural network G to generate a modified image $\tilde{x}$.

As further shown in FIG. 3, the language-guided image-editing system 106 also determines a loss 304 between the modified image $\tilde{x}$ and a ground truth modified image 305. Indeed, in one or more embodiments, the ground truth modified image 305 includes a version of the image x that was modified (e.g., via a user using an editing application or automatically through editing operations as described below in relation to augmented data) to include the modifications described in the modification request text t. Accordingly, in some embodiments, the language-guided image-editing system 106 utilizes the ground truth modified image 305 as a reference point to gauge the accuracy of the modified image generated by the generative adversarial neural network G. Upon determining the loss 304, in one or more embodiments, the language-guided image-editing system 106 learns parameters of the generative adversarial neural network G as described in greater detail below (e.g., in relation to FIGS. 4A, 4B, and 5).

As further shown in FIG. 3, the language-guided image-editing system 106 utilizes the modified image x̃ and the image x with an editing description neural network to generate a natural language embedding In one or more embodiments, the generated natural language embedding $e_{x \to \tilde{x}}$ describes visual changes (or modifications) from image x to modified image x̃. Subsequently, as shown in FIG. 3, the generated natural language embedding $e_{x \to \tilde{x}}$ is compared to the natural language embedding h to determine a cycle loss 308. Indeed, in one or more embodiments, the cycle loss 308 represents (or indicates) a similarity (or dissimilarity) between the natural language embedding h that was input into the generative adversarial neural network G and the natural language embedding generated from the editing description neural network 306.

Additionally, the language-guided image-editing system 106 learns parameters of the editing description neural network 306 utilizing the cycle loss 308. In particular, the language-guided image-editing system 106 learns parameters of the editing description neural network 306 to generate a version of the natural language embedding $e_{x \to \tilde{x}}$ that minimizes (or reduces) the cycle loss 308 between the natural language embedding h and the natural language embedding $e_{x \to \tilde{x}}$. To do so, in one or more embodiments, the language-guided image-editing system 106 iteratively performs the process of generating the natural language embedding $e_{x \to \tilde{x}}$ and utilizing a cycle loss to learn parameters of the editing description neural network 306 for the image x (and various other images).

As suggested above, many conventional systems fail to accurately and flexibly generated modified images from images and natural language-based modification requests because of the difficulty of machine learning models to understand language requests well (e.g., due to the insufficient and unbalanced training data distribution). In one or more embodiments, the language-guided image-editing system 106 utilizes the editing description neural network to predict natural language embeddings given a pair of images to create a cyclic loop with the GAN that is able to generate and input predicted natural language embeddings into the GAN. The language-guided image-editing system 106 utilizes the cyclic mechanism to learn parameters of the GAN by utilizing the predicted natural language embeddings from the editing description neural network (instead of only user provided modification request annotations).

In some embodiments, as shown in FIG. 3, the language-guided image-editing system 106 utilizes a language encoder to generate a natural language embedding that describes a modification request (for the editing description neural network). For example, the language-guided image-editing system 106 encodes a natural language text (request) t, using a language encoder, to generate a natural language embedding h∈$\mathbb{R}^{C_h}$ that represents a modification request. In some implementations, the language-guided image-editing system 106 generates the natural language embedding h∈ $\mathbb{R}^{C_h}$ as an embedding within an embedded space that includes various characteristics of natural language text in relation to editing operations and/or visual features of images. In one or more embodiments, as mentioned above, the language-guided image-editing system 106 utilizes a deep learning model as a language encoder such as, but not limited to, a recurrent neural network (e.g., a long short-term memory (LSTM) network and/or a bilateral LSTM (biLSTM)).

In addition, in one or more embodiments, the language-guided image-editing system 106 utilizes an editing description neural network which receives an input image x and a generated modified image to generate an editing embedding $e_{x \to \tilde{x}}$ that indicates editing operations between the input image x and the generated modified image x̃. For example, to generate (or create) the editing description neural network, the language-guided image-editing system 106 utilizes a feature extractor (e.g., an image encoder) to encode an input image x and a target image y (e.g., a modified image x̃) into visual feature maps $F_x, F_y \in \mathbb{R}^{C_f \times N \times N}$ for the input image x and the target image y in accordance with the following function:

$$F_x = \text{FeatureExtractor}(x) \quad (1)$$

and $$F_y = \text{FeatureExtractor}(y) \quad (2)$$

In one or more embodiments, the language-guided image-editing system 106 utilizes $C_f$ as a number of channels for the visual feature maps $F_x$ and $F_y$ and N as the height or width of the feature maps $F_x$ and $F_y$. In addition, in one or more implementations, the language-guided image-editing system 106 utilizes a feature extractor (or image encoder) such as, but not limited to, a convolutional neural network and/or a residual convolutional neural network (e.g., ResNet with various numbers of layers).

A feature map (or visual feature map) includes a spatial-relational construct of an object (or visual scene) from an image in terms of activations of neurons of a neural network. In one or more embodiments, a feature map includes one or more representations of characteristics and/or features of content within an image (e.g., a set of values represented through feature vectors). For instance, a feature map represents latent and/or patent attributes related to an image. Indeed, in some embodiments, a feature map is learned by a machine learning algorithm (e.g., a neural network) through the analysis of an image.

Upon generating the visual feature maps for the image x and the target image y, the language-guided image-editing system 106 (through the editing description neural network) utilizes, in some embodiments, attention to model editing operations between the images using the visual feature maps. For example, the language-guided image-editing system 106 utilizes an input-to-target attention to compute, for a feature $F_x^i$ from the visual feature map $F_x$, an alignment with a feature $F_y^i$ from the visual feature map $F_y$. Indeed, in one or more embodiments, the language-guided image-editing system 106 utilizes the input-to-target attention to compute an alignment for each feature $F_x^i$ from the visual feature map $F_x$ of the image x to various features $F_y^i$ from the visual feature map $F_y$ of the target image y (e.g., a modified image x̃).

Subsequently, in one or more embodiments, the language-guided image-editing system 106 (through the editing description neural network) flattens and merges the visual feature maps and the attended target features (e.g., the aligned features $F_x^i$ and $F_y^i$) to generate a natural language embedding. In particular, in one or more embodiments, the language-guided image-editing system 106 flattens and merges the visual feature maps and the attended target features (e.g., the aligned features $F_x^i$ and $F_y^i$) together utilizing a fully-connected layer (of the editing description neural network) to generate a natural language embedding that represents a modification (or transformation) from the image x to the target image y. For example, the language-guided image-editing system 106 (through the editing description neural network) flattens and merges the visual feature maps and the attended target features (e.g., the aligned features $F_x^i$ and $F_y^i$) together to generate a natural language embedding $e_{x \rightarrow y} \in \mathbb{R}^{C_h}$ in accordance with the following functions:

$$\alpha_{x \rightarrow y}^{i,j} = \text{softmax}_j((W_1 F_x^i)^\top (W_2 F_y^j)) \quad (3)$$

$$F_{x \rightarrow y}^i = \sum_j \alpha_{x \rightarrow y}^{i,j} F_y^j \quad (4)$$

and $$e_{x \rightarrow y} = \tanh(W_3[F_x; F_{x \rightarrow y}] + b_3) \quad (5)$$

In certain instances, in reference to functions (3)-(5), the language-guided image-editing system 106 utilizes weights W as attention weights. Furthermore, in some embodiments, the language-guided image-editing system 106 decomposes the attention weights into matrices $W_1$ and $W_2$ to reduce the number of parameters while generating the natural language embedding $e_{x \rightarrow y} \in \mathbb{R}^{C_h}$. Indeed, in one or more embodiments, the language-guided image-editing system 106 utilizes the attention weights as matrices $W_1$ and $W_2$ due to a large dimension of visual feature maps $F_x$ and $F_y$.

Furthermore, in one or more embodiments, the language-guided image-editing system 106 also learns parameters of the editing description neural network utilizing a loss between a natural language embedding generated by the editing description neural network and an input natural language embedding (as described in relation to FIG. 3). To illustrate, in one or more embodiments, the language-guided image-editing system 106 utilizes a CAGAN G(x,h) to generate a modified image from an image x and an input natural language embedding h in accordance with the following function:

$$\tilde{x} = G(x, h) \quad (6)$$

Then, in some embodiments, the language-guided image-editing system 106 utilizes an editing description neural network ED(x, x̃) to generate a natural language embedding $e_{x \rightarrow \tilde{x}}$ in accordance with the following function:

$$e_{x \rightarrow \tilde{x}} = ED(x, \tilde{x}) \quad (7)$$

Then, in one or more implementations, the language-guided image-editing system 106 utilizes the cross-modal cyclic mechanism to learn parameters of an editing description neural network to maximize a similarity between generated natural language embeddings and input natural language embeddings h. For instance, the language-guided image-editing system 106 utilizes a cycle consistency loss $\mathcal{L}_{cyc}$ that maximizes a cosine similarity between the natural language embeddings and h in accordance with the following function:

$$\mathcal{L}_{cyc} = 1 - \frac{e_{x \rightarrow \tilde{x}} \cdot h}{\|e_{x \rightarrow \tilde{x}}\| \|h\|} \quad (8)$$

Indeed, in one or more embodiments, the language-guided image-editing system 106 learns parameters of the editing description neural network (e.g., by adjusting parameters, utilizing back propagation) that maximize the similarity between the natural language embeddings $e_{x \rightarrow \tilde{x}}$ and h using the cycle consistency loss $\mathcal{L}_{cyc}$ (e.g., reducing the loss).

Although one or more embodiments illustrate the language-guided image-editing system 106 utilizing a cosine similarity between the natural language embeddings $e_{x \rightarrow \tilde{x}}$ and h, the language-guided image-editing system 106, in some instances, utilizes various types of losses (e.g., Euclidean distance, Manhattan distance) between the natural language embeddings $e_{x \rightarrow \tilde{x}}$ and h to train the editing description neural network.

In some embodiments, the language-guided image-editing system 106 utilizes a trained editing description neural network to generate a natural language embedding $e_{x \rightarrow \tilde{x}}$ that accurately describes a modification request (or transformation) from the image x to the modified image x̃. For example, the resulting natural language embedding includes an embedding within an embedded space that includes various characteristics of natural language text in relation to editing operations and/or visual features of images. Accordingly, in one or more embodiments, the language-guided image-editing system 106 utilizes various modifications to images (e.g., to augment training data) and corresponding original images with the editing description neural network to generate an accurate natural language embedding between the pairs of images to train a CAGAN to accurately generate modified images based on a natural language modification request.

Figure 4A:
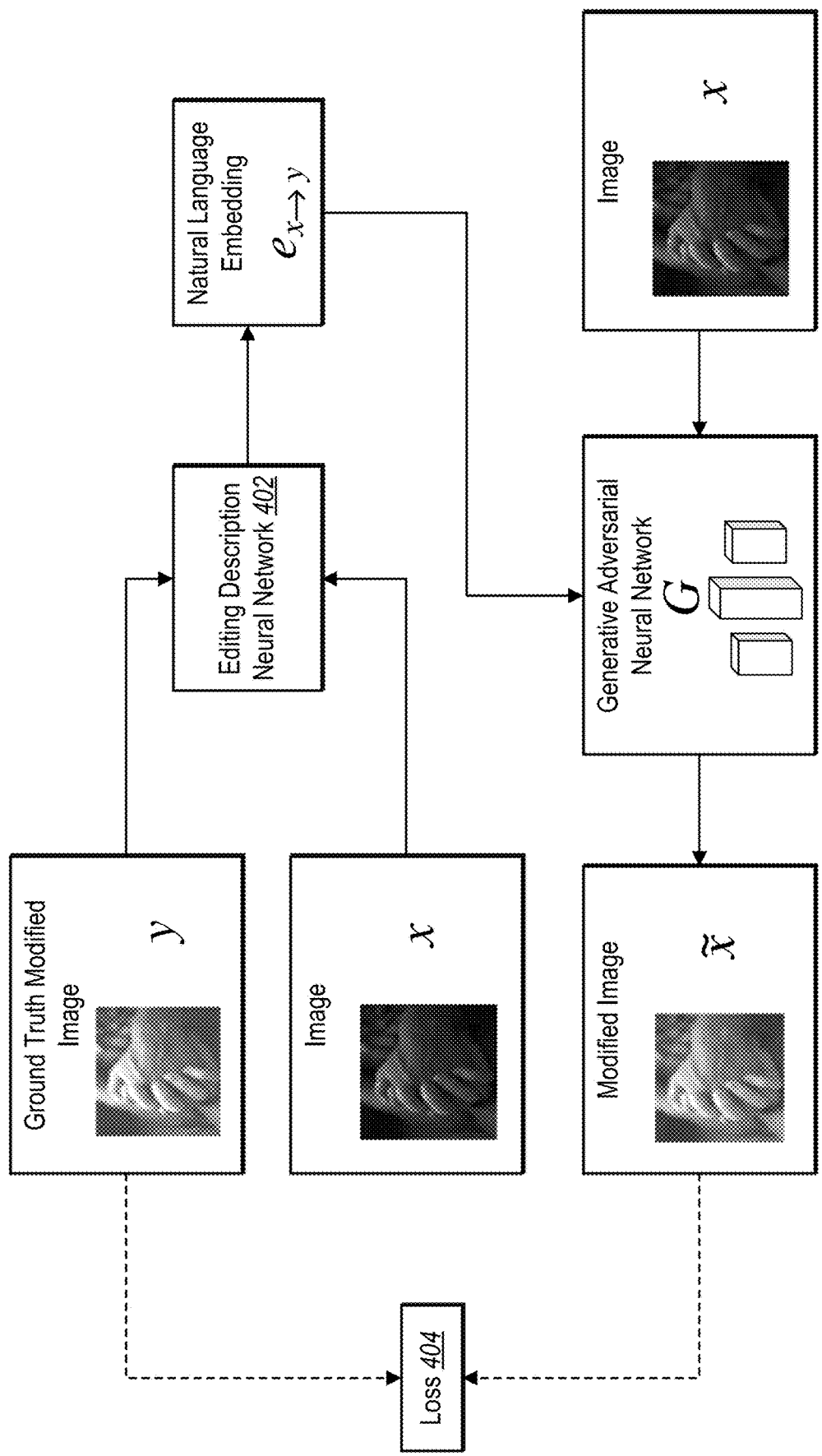
FIG. 4A illustrates a language-guided image-editing system training a generative adversarial neural network to generate modified images from natural language modification requests utilizing an editing description neural network in accordance with one or more implementations.
Figure 4B:
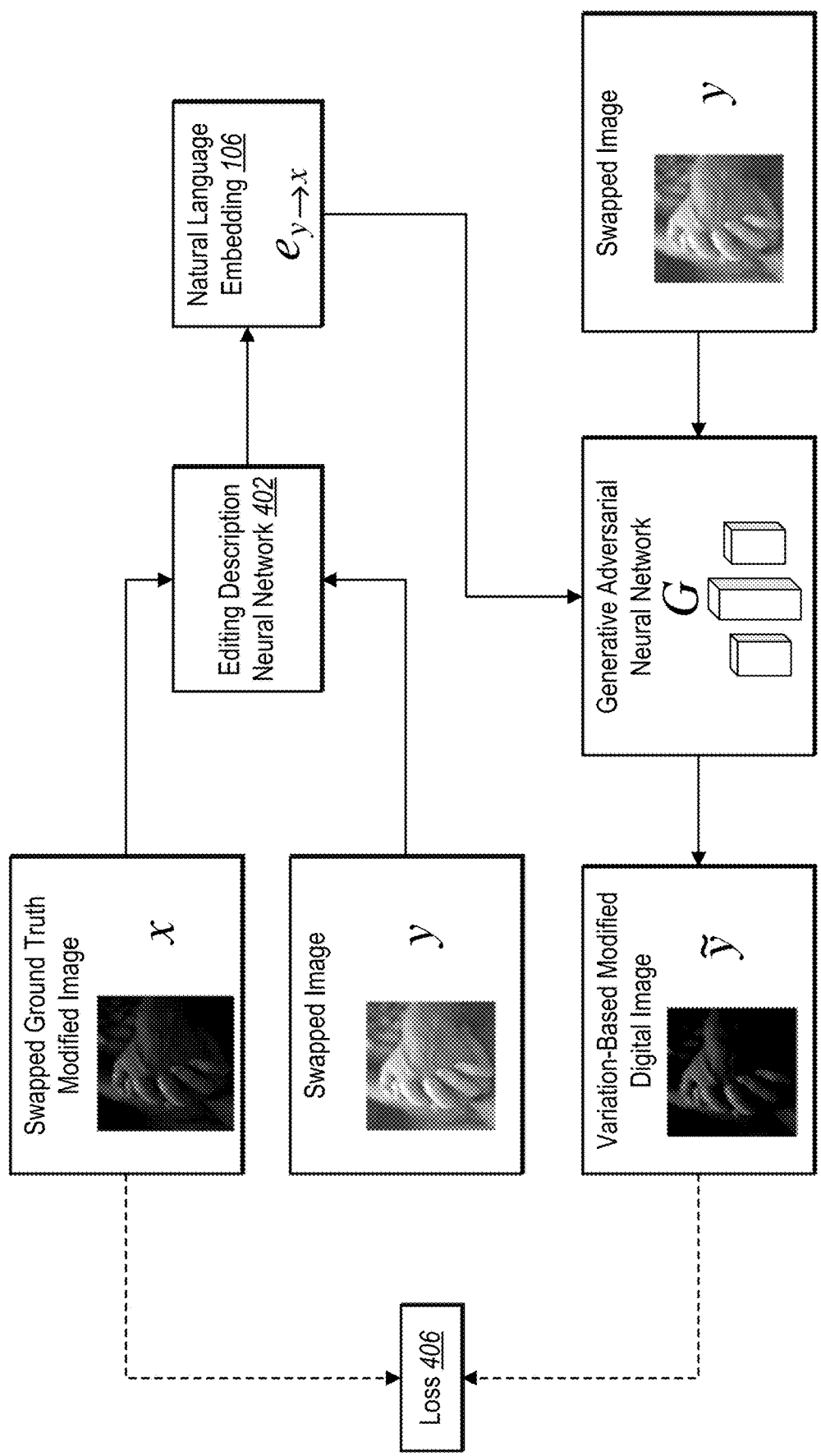
FIG. 4B illustrates a language-guided image-editing system training a generative adversarial neural network utilizing an editing description neural network with data augmentation through image swapping in accordance with one or more implementations.
Figure 5:
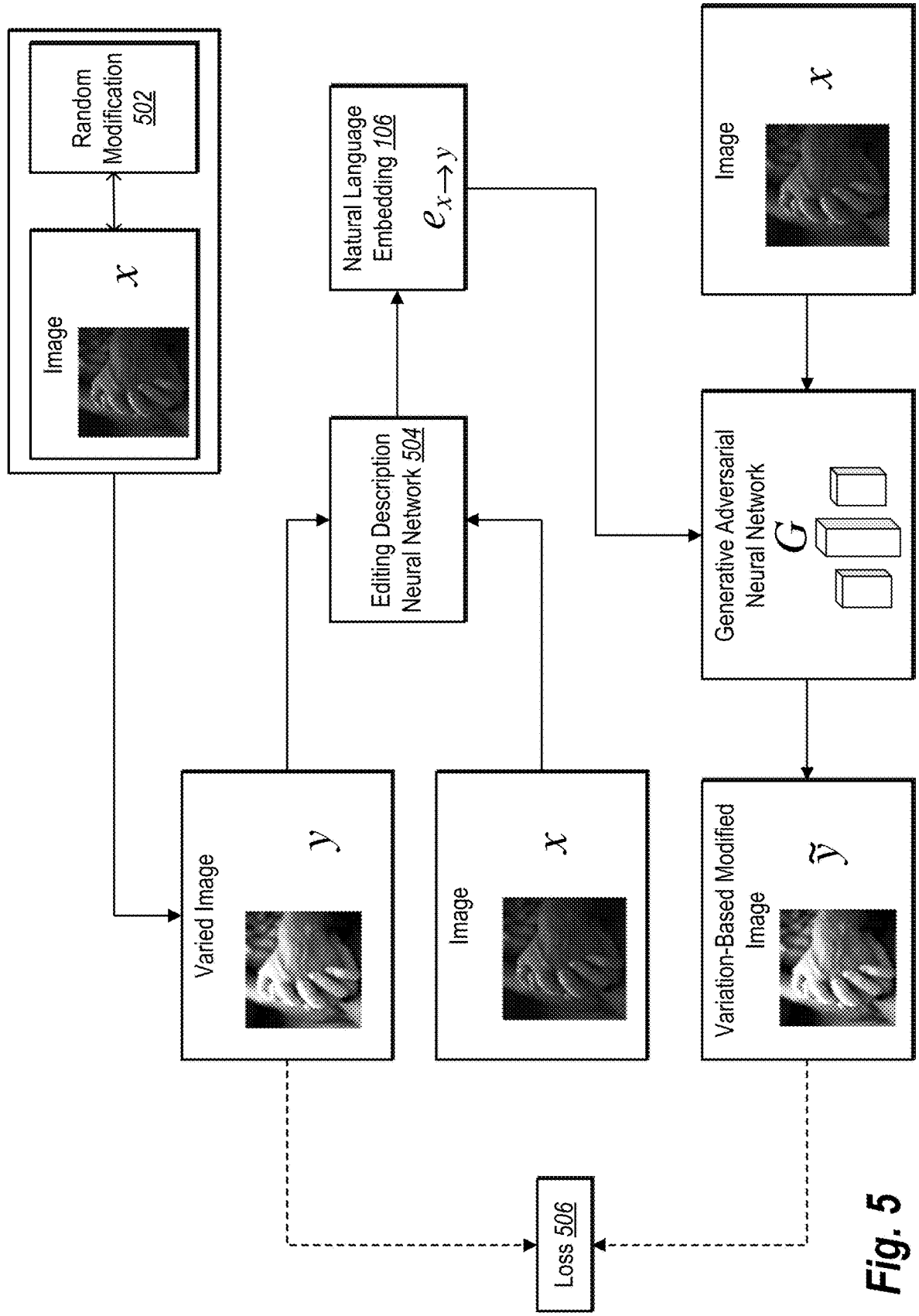
FIG. 5 illustrates a language-guided image-editing system training a generative adversarial neural network utilizing an editing description neural network with data augmentation through random modification in accordance with one or more implementations.

For instance, as previously mentioned, the language-guided image-editing system 106 utilizes the cross-modal cyclic mechanism to also learn parameters of a GAN (or CAGAN). For example, FIG. 4A illustrates the language-guided image-editing system 106 training a GAN to generate modified images from natural language modification requests utilizing an editing description neural network. Moreover, FIGS. 4B and 5 illustrate the language-guided image-editing system 106 training a GAN to generate modified images from natural language modification requests utilizing an editing description neural network and an augmented dataset of images.

As shown in FIG. 4A, the language-guided image-editing system 106 utilizes an image x and a ground truth modified image y (that is a modified or edited version of the image x) with an editing description neural network 402 to generate a natural language embedding $e_{x \rightarrow y}$. For instance, as described above, the editing description neural network 402 generates the natural language embedding $e_{x \rightarrow y}$ to represent (or describe) the visual changes from the image x to the ground truth image y. Indeed, in one or more embodiments, the natural language embedding $e_{x \rightarrow y}$ is utilized, by the language-guided image-editing system 106, as a substitute for a natural language embedding generated from a natural language text that describes a modification request for the image x to obtain the ground truth modified image y.

Then, as shown in FIG. 4A, the language-guided image-editing system 106 utilizes a generative adversarial neural network G to generate a modified image based on the image x and the natural language embedding $e_{x \rightarrow y}$. As illustrated in FIG. 4A, the modified image reflects visual changes to image x based on the modification request described within the natural language embedding $e_{x \rightarrow y}$. Accordingly, as shown in FIG. 4A, the modified image is similar to the ground truth modified image y (e.g., a brighter version of the image x) Subsequently, the language-guided image-editing system 106 determines a loss 404 between the modified image and the ground truth modified image y that represents a similarity (or dissimilarity) between the modified image x̃ and the ground truth modified image y. Indeed, in one or more embodiments, the language-guided image-editing system 106 utilizes the loss 404 to learn (or update) parameters of the generative adversarial neural network G. Moreover, in one or more implementations, the language-guided image-editing system 106 iteratively learns (or updates) parameters of the generative adversarial neural network G iteratively to minimize (or reduce) the loss 404.

In one or more embodiments, the language-guided image-editing system 106 utilizes a generative adversarial neural network that synthesizes an image (e.g., a modified image) utilizing input signals of an image and a text-based language embedding (e.g., a natural language embedding). In particular, in some embodiments, the generative adversarial neural network models a natural language embedding that represents a modification request to predict editing operations within an input image to generate a modified image that includes (or reflects) the predicted editing operations. Indeed, in one or more embodiments, the language-guided image-editing system 106 utilizes a generative adversarial neural network such as, but not limited to, a CycleGAN, MirrorGAN, and/or a conditional GAN.

Furthermore, in certain instances, the language-guided image-editing system 106 determines various losses to train the generative adversarial neural network (e.g., such as loss 404 from FIG. 4A). For example, in reference to FIG. 4A, the language-guided image-editing system 106 determines an L1 loss $\mathcal{L}_G^{L1}$ (as the loss 404) for the generative adversarial neural network G using the modified image $\tilde{x}$ and the ground truth modified image y in accordance with the following function:

$$\mathcal{L}_G^{L1} = |\tilde{x} - y| \qquad (9)$$

Additionally, in reference to FIG. 3, the language-guided image-editing system 106 also determines the L1 loss as a reconstruction loss $\mathcal{L}_{rec}$ between a modified image, generated by the generative adversarial neural network G utilizing an image x and an output natural language embedding between an image x and a ground truth modified image y from an editing description neural network ED, and the ground truth modified image y in accordance with the following function:

$$\mathcal{L}_{rec} = |G(x, ED(x,y)) - y| \qquad (10)$$

Furthermore, in some embodiments, the language-guided image-editing system 106 determines an adversarial loss $\mathcal{L}_D^{adv}$ (e.g., as the loss 404) for the generative adversarial neural network G using the modified image $\tilde{x}$ in accordance with the following function:

$$\mathcal{L}_G^{adv} = -\mathbb{E}_{\tilde{x} \sim \mathcal{P}_{model}}[\log D(\tilde{x})] \qquad (11)$$

Moreover, in one or more implementations, the language-guided image-editing system 106 determines a discriminator loss $\mathcal{L}_G^{adv}$ (e.g., as the loss 404) using a discriminator D with the modified image $\tilde{x}$ and the ground truth modified image y in accordance with the following function:

$$\mathcal{L}_D^{adv} = -\mathbb{E}_{y \sim \mathcal{P}_{data}}[\log D(y)] - \mathbb{E}_{\tilde{x} \sim \mathcal{P}_{model}}[\log(1 - D(\tilde{x}))] \qquad (12)$$

In one or more embodiments, the language-guided image-editing system 106 utilizes various combinations of the above-mentioned losses (e.g., from functions (9)-(12)) to learn parameters of the generative adversarial neural network. For instance, the language-guided image-editing system 106 learns parameters of the generative adversarial neural network (e.g., by adjusting parameters, utilizing back propagation) to maximize the similarity (or likeness) between the modified image and the ground truth modified image y using the various above-mentioned losses. In some implementations, the language-guided image-editing system 106 iteratively learns parameters of the generative adversarial neural network to minimize (or reduce) the above-mentioned losses between the modified image $\tilde{x}$ and the ground truth modified image y. Indeed, in one or more embodiments, the language-guided image-editing system 106 utilizes various combinations of the L1 (or reconstruction) loss, adversarial loss, and/or discriminator loss to learn parameters of the generative adversarial neural network.

Furthermore, as previously mentioned, the language-guided image-editing system 106 augments training data of a generative adversarial neural network utilizing an editing description neural network and variations of images. For example, FIG. 4B illustrates the language-guided image-editing system 106 utilizing a swapping augmentation approach with an editing description neural network to train the generative adversarial neural network. As shown in FIG. 4B, the language-guided image-editing system 106 swaps the image x and the ground truth modified image y (from FIG. 4A) to obtain swapped image y and swapped ground truth modified image x.

Upon swapping the images, as shown in FIG. 4B, the language-guided image-editing system 106 utilizes the editing description neural network 402 to generate a natural language embedding $e_{y \rightarrow x}$. In particular, in one or more embodiments, the natural language embedding $e_{y \rightarrow x}$ describes the editing operations to transform the swapped image y into the swapped ground truth modified image x. Subsequently, as illustrated in FIG. 4B, the language-guided image-editing system 106 utilizes the swapped image y and the generated natural language embedding $e_{y \rightarrow x}$ with the generative adversarial neural network G to generate a variation-based modified image $\tilde{y}$. Indeed, as shown in FIG. 4B, the variation-based modified image $\tilde{y}$ is similar to the swapped ground truth modified image x (e.g., a darker version of the swapped image y).

Subsequently, as illustrated in FIG. 4B, the language-guided image-editing system 106 compares the swapped ground truth modified image x with the variation-based modified image $\tilde{y}$ to determine a loss 406. As described above, in one or more embodiments, the language-guided image-editing system 106 utilizes the loss 406 (e.g., an L1 or reconstruction loss, adversarial loss, and/or discriminator loss) to learn parameters of the generative adversarial neural network G (e.g., to increase the accuracy of the generative adversarial neural network G). Indeed, in one or more embodiments, by swapping images for available training image pairs and utilizing the editing description neural network to generate natural language embeddings for the swapped training pairs, the language-guided image-editing system 106 augments the training data for a generative adversarial neural network. As an example, by swapping a training image pair, the language-guided image-editing system 106 reverses the modification (e.g., from bright to dark to dark to bright) and also utilizes the editing description network to generate a natural language embedding that describes the reversed modification request. In certain instances, by augmenting the training data of the generative adversarial neural network utilizing the editing description neural network, the language-guided image-editing system 106 provides a more balanced and sufficient training dataset.

Furthermore, in some embodiments, the language-guided image-editing system 106 also utilizes an augmentation loss for the variation-based modified image $\tilde{y}$ and the swapped ground truth modified image x (in reference to FIG. 4B) to train the generative adversarial neural network G. To illustrate, in one or more embodiments, the language-guided image-editing system 106 determines an augmentation loss that accounts for a reconstruction loss between a ground truth image y and a modified image generated using a generative adversarial neural network G based on an image x and a natural language embedding from an editing description neural network ED that describes a transformation from the image x to the ground truth image y. Additionally, in one or more implementations, the language-guided image-editing system 106 determines the augmentation loss to also account for a reconstruction loss after swapping by determining a loss between a swapped image x and a modified image generated using a generative adversarial neural network G based on a swapped ground truth image y and a natural language embedding from the editing description neural network ED that describes a transformation from the swapped ground truth image y to the swapped image x. More specifically, in one or more embodiments, the language-guided image-editing system 106 determines an augmentation loss $\mathcal{L}_{aug}$ in accordance with the following function:

$$\mathcal{L}_{aug} = |G(x,ED(x,y))-y| + |G(y\ ED(y,x))-x| \quad (13)$$

Additionally, as previously mentioned, in some embodiments, the language-guided image-editing system 106 augments training data of a generative adversarial neural network utilizing an editing description neural network and variations of images based on random modification of the images. FIG. 5 illustrates the language-guided image-editing system 106 utilizing random modification of images and an editing description neural network to train a generative adversarial neural network. In particular, as shown in FIG. 5, the language-guided image-editing system 106 utilizes a random modification 502 on an image x to generate a varied image y. Then, as shown in FIG. 5, the language-guided image-editing system 106 utilizes the varied image y and the image x with the editing description neural network 504 to generate a natural language embedding $e_{x \rightarrow y}$ that describes the visual changes from the image x to the varied image y.

As further shown in FIG. 5, the language-guided image-editing system 106 utilizes the generative adversarial neural network G to generate a variation-based modified image ŷ based on the image x and the natural language embedding $e_{x \rightarrow y}$. As shown in FIG. 5, the variation-based modified image ŷ60 is similar to the varied image y (e.g., a brighter the image x with added contrast). Moreover, as illustrated in FIG. 5, the language-guided image-editing system 106 determines a loss 506 between the variation-based modified image ŷ and the varied image y. As described above, in certain instances, the language-guided image-editing system 106 utilizes the loss 506 (e.g., an L1 or reconstruction loss, adversarial loss, and/or discriminator loss) to learn parameters of the generative adversarial neural network G (e.g., to increase the accuracy of the generative adversarial neural network G).

In order to randomly modify an image to generate a varied image for the above-mentioned training data augmentation, in one or more embodiments, the language-guided image-editing system 106 applies various editing operations to transform an image into a randomly modified variation of the image. For example, the language-guided image-editing system 106 utilizes various editing operations such as, but not limited to, adjustments to brightness, hue, tone, saturation, contrast, and/or exposure within an image. Furthermore, in some embodiments, the language-guided image-editing system 106 utilizes editing operations such as a removal of one or more objects depicted within an image to generate a variation of the image. In one or more embodiments, the language-guided image-editing system 106 utilizes a predetermined (or preset) grouping of editing operations on available training images to augment the training dataset.

Furthermore, in some embodiments, the language-guided image-editing system 106 also utilizes an augmentation loss for the variation-based modified image ŷ and the varied image y (in reference to FIG. 5) to train the generative adversarial neural network G. For instance, the language-guided image-editing system 106 determines an augmentation loss that accounts for a reconstruction loss between a ground truth modified image z and a modified image generated using a generative adversarial neural network G based on an image x and a natural language embedding from an editing description neural network ED that describes a transformation from the image x to the ground truth modified image z. Moreover, in some embodiments, the language-guided image-editing system 106 also determines an augmentation loss that accounts for a reconstruction loss between a varied image y (e.g., generated through random modification) and a modified image generated using a generative adversarial neural network G based on an image x and a natural language embedding from an editing description neural network ED that describes a transformation from the image x to the varied image y. For example, in one or more embodiments, the language-guided image-editing system 106 determines an augmentation loss $\mathcal{L}_{aug}$ utilizing random adjustments (e.g., random modifications) in accordance with the following functions:

$$y = \text{random\_adjust}(x)$$

$$\mathcal{L}_{aug} = |G(x,ED(x,z))-z| + |G(x,ED(x,y))-y| \quad (14)$$

Furthermore, in some embodiments, the language-guided image-editing system 106 randomly modifies both images to augment the training dataset and determine an augmentation loss to train the generative adversarial neural network. For instance, the language-guided image-editing system 106 determines a first reconstruction loss by determining a loss between an image y and a modified image generated using a generative adversarial neural network G based on the image y and a natural language embedding from an editing description neural network ED that describes a transformation from the image y to the image x. Furthermore, in some embodiments, the language-guided image-editing system 106 generates a varied image x' by randomly modifying image x and a varied image y' by randomly modifying image y.

Then, in some embodiments, the language-guided image-editing system 106 determines a second reconstruction loss by determining a loss between the varied image x' and a modified image generated using a generative adversarial neural network G based on the varied image x' and a natural language embedding from an editing description neural network ED that describes a transformation from the varied image x' to the varied image y'. For example, the language-guided image-editing system 106 determines an augmentation loss $\mathcal{L}_{aug}$ utilizing random adjustments (e.g., random modifications) to both images in accordance with the following functions:

$$x' = \text{random\_adjust}(x)$$

$$y' = \text{random\_adjust}(y) \quad (15)$$

$$\mathcal{L}_{aug} = |G(y\ ED(y,x))-x| + |G(x',ED(x',y'))-y'|$$

As previously mentioned, the language-guided image-editing system 106 also utilizes a CAGAN (as described above) with an attention algorithm to generate a modified image that includes an adaptive degree of editing at different spatial locations of an image. In some embodiments, the language-guided image-editing system 106 utilizes the CAGAN with a natural language text describing a global modification (e.g., increase the brightness, increase the contrast, decrease the saturation) to generate a modified image that adaptively applies the requested editing operations based on visual differences in different spatial locations of an image. To do so, in one or more embodiments, the language-guided image-editing system 106 utilizes an attention algorithm based on a calculated attention matrix (from a visual feature map of the image and the natural language embedding) and the visual feature map.

An attention matrix includes a set (or array) of values that represents a degree of editing at various spatial locations of an image. In particular, in one or more embodiments, an attention matrix includes a set of values based on correlations between a visual feature map of an image and a natural language embedding for a modification request within an embedded space. As an example, a larger value in the attention matrix indicates a greater degree of editing at the spatial location of the image corresponding to the value. In one or more embodiments, the language guided image editing system determines values of the attention matrix based on learnable parameters that apply to the visual feature map and the natural language embedding.

Figure 6:
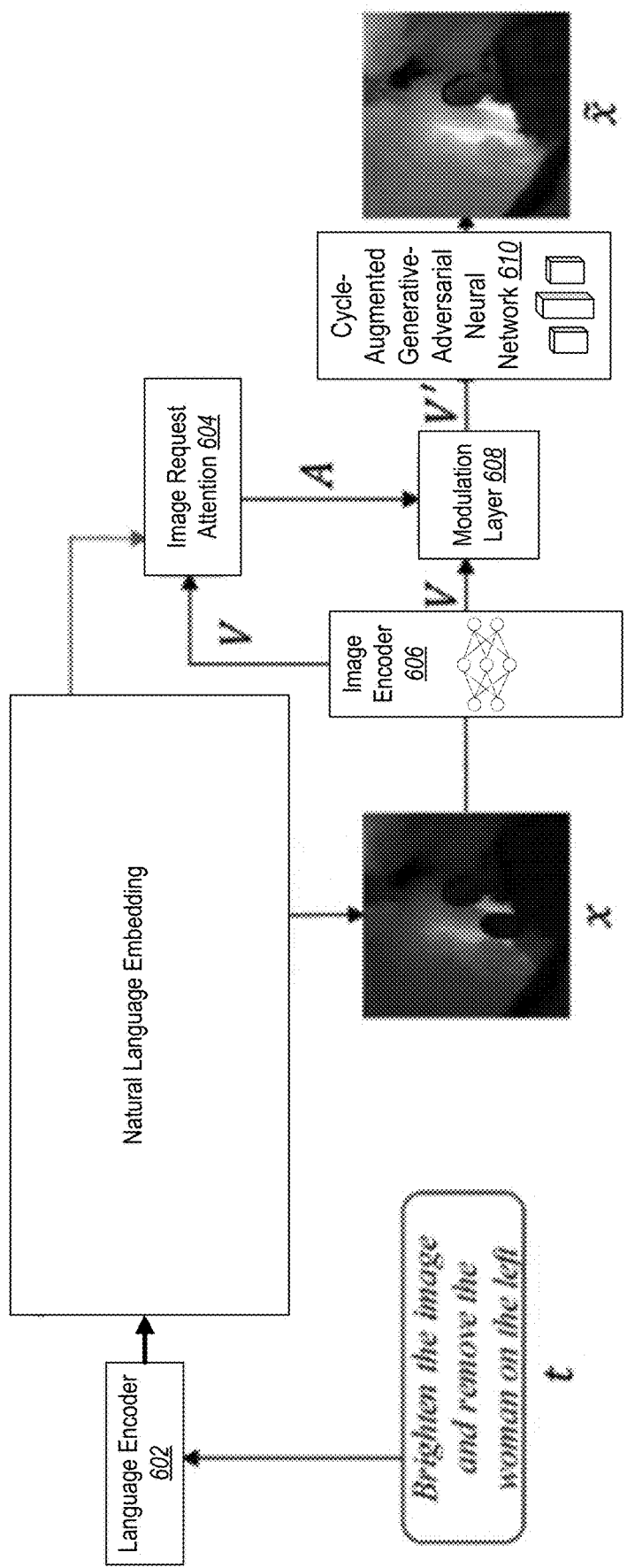
FIG. 6 illustrates a flow diagram of a language-guided image-editing system utilizing an attention adaptive approach in accordance with one or more implementations.

For example, FIG. 6 illustrates a flow diagram of the language-guided image-editing system 106 utilizing an attention adaptive approach with a CAGAN to generate a modified image. As shown in FIG. 6, the language-guided image-editing system 106 utilizes a natural language text t (e.g., "brighten the image and remove the woman on the left") with a language encoder 602 to generate a natural language embedding h (as described above). Additionally, as illustrated in FIG. 6, the language-guided image-editing system 106 generates a visual feature map V from an image x utilizing an image encoder 606.

As further shown in FIG. 6, the language-guided image-editing system 106 utilizes the visual feature map V and the natural language embedding h with an image request attention module 604 to generate an attention matrix A. Also, as shown in FIG. 6, the language-guided image-editing system 106 utilizes a modulation layer 608 to generate a modified visual feature map V' based on the attention matrix A and the visual feature map V. Indeed, in one or more embodiments, the modified visual feature map V' is generated through the scaling and shifting of the visual feature map V using a reweighted natural language embedding that indicates degrees of editing within different locations of an image (as described below).

Furthermore, as illustrated in FIG. 6, the language-guided image-editing system 106 utilizes a cycle augmented generative adversarial neural network 610 (as described above) to generate a modified image x̃ based on the modified visual feature map V'. As shown in FIG. 6, the generated modified image x̃ removes the woman on the left (depicted in the original image x) and also brightens the image. Furthermore, as illustrated in FIG. 6, due to the attention based modified visual feature map V', the modified image x̃ includes different amounts of brightness increases at different spatial locations of the image x̃ (e.g., the dark portions of the bottom left corner are maintained while other regions of the image x̃ are brightened).

Figure 7:
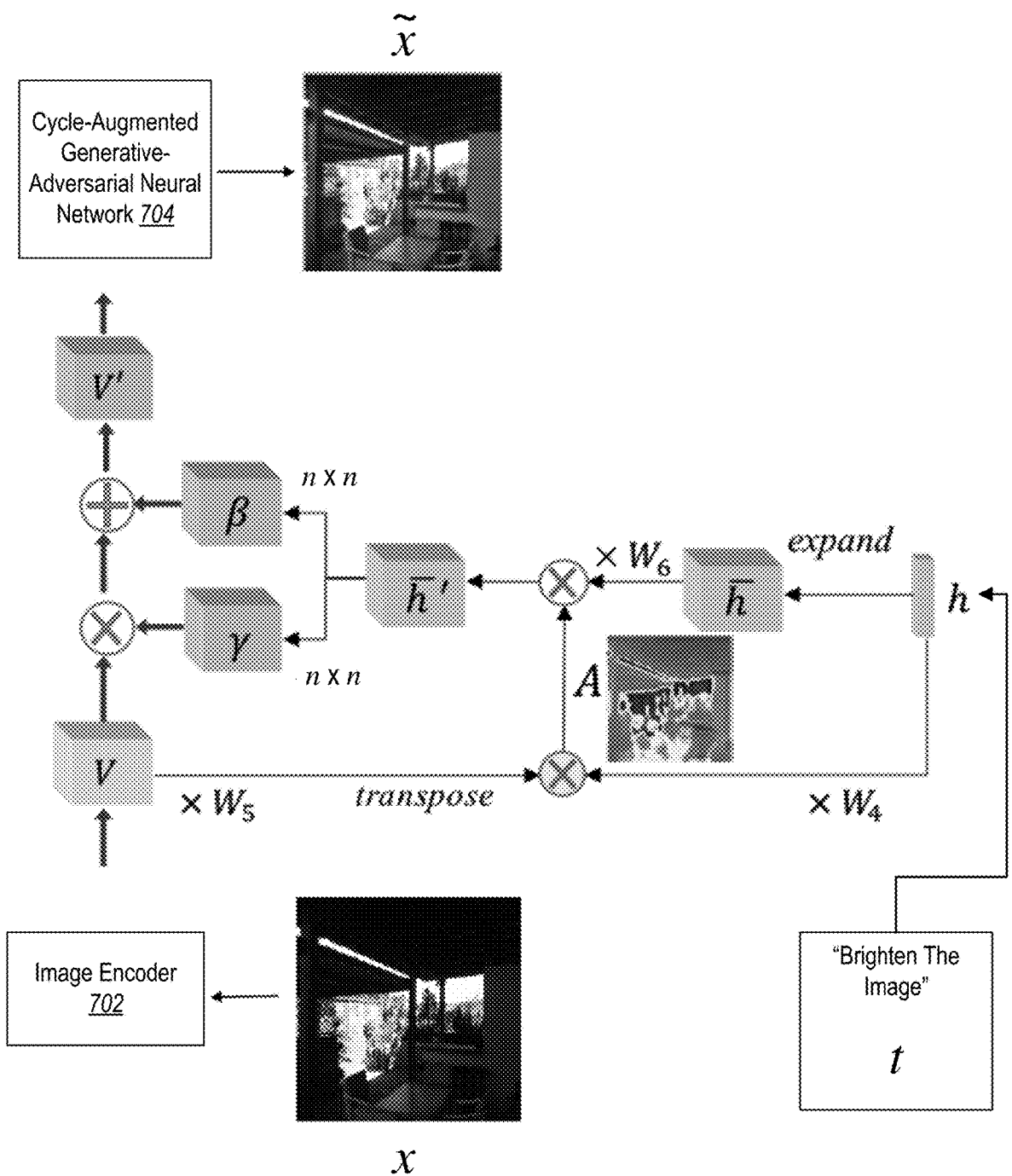
FIG. 7 illustrates a language-guided image-editing system utilizing an image request attention approach with a modulation layer to generate a modified image that includes an adaptive degree of editing in different spatial locations of an image in accordance with one or more implementations.

More specifically, FIG. 7 illustrates the language-guided image-editing system 106 utilizing an image request attention approach and a modulation layer with the CAGAN to generate a modified image that includes an adaptive degree of editing at different spatial locations of an image. For instance, FIG. 7 illustrates the language-guided image-editing system 106 utilizing a natural language embedding (h) and an attention matrix (A) that is calculated from a visual feature map V of an image x and the natural language embedding h to generate a modified visual feature map V'. As further shown in FIG. 7, the language-guided image-editing system 106 utilizes a cycle augmented generative adversarial neural network 704 with the modified visual feature map V' to generate a modified image that includes visual modifications from the visual modification request (e.g., natural language text t) in different spatial locations of the image x.

As shown in FIG. 7, the language-guided image-editing system 106 generates a visual feature map V utilizing an image encoder 702 with the image x. Then, the language-guided image-editing system 106 utilizes the visual feature map V and a natural language embedding h (generated from a natural language text t as described above) to generate an attention matrix A (e.g., using learnable parameters $W_5$ and $W_4$ and matrix multiplication). As further shown in FIG. 7, the language-guided image-editing system 106, in some embodiments, utilizes the attention matrix A to determine an attention map.

An attention map includes a channel or data file that stores values that indicate an attention at different spatial locations of an image. Indeed, in one or more embodiments, an attention map includes values in relation to an image by storing values in connection with spatial locations of the image. In one or more implementations, the attention map includes values from an attention matrix overlayed (e.g., as a reference) on an image to indicate degrees of editing at different spatial locations of the image (e.g., as a heat map, displacement map, or a map of attention matrix values). Indeed, as used in this disclosure, a degree of editing includes an indication of an amount or a magnitude of editing (from an editing operation) that the language guided image editing system (via a GAN) should include or apply at a particular spatial location within an image.

Furthermore, as shown in FIG. 7, the language-guided image-editing system 106 expands the natural language embedding h to generate an expanded natural language embedding h̄. Then, as shown in FIG. 7, the language-guided image-editing system 106 utilizes the expanded natural language embedding h̄ (e.g., and a learnable parameter $W_6$) with the attention matrix A to generate the reweighted natural language embedding h̄' (e.g., utilizing element-wise multiplication). Moreover, as illustrated in FIG. 7, the language-guided image-editing system 106 utilizes the reweighted natural language embedding h̄' and modulation parameters β and γ (from a modulation layer) with the visual feature map V to generate a modified feature map V' that accounts for different degrees of editing at different spatial locations of the image x.

As further illustrated in FIG. 7, the language-guided image-editing system 106 utilizes the modified feature vector V' with the cycle augmented generative adversarial neural network 704 to generate the modified image x̃. As shown in FIG. 7, the modified image depicts the image x with adaptive edits across different spatial locations within the image x. For instance, as illustrated in FIG. 7, the modified image x̃ depicts an increased brightness in the top half portion of the image while applying a lesser increase in brightness on the bottom half portion of the image. As an example, for a natural language modification request "brighten the image please," the language-guided image-editing system 106 utilizes the reweighted natural language embedding h̄' and modulation parameters β and γ to determine that darker regions in image x should be brightened (and, therefore, in the modified image x̃ is brighter in specific spatial locations). As another example, for a natural language request "I want to brighten the ceiling," the language-guided image-editing system 106 utilizes the reweighted natural language embedding h̄' and modulation parameters β and γ to focus attention on the ceiling depicted within the image x such that the modified image x̃ is brighter in the spatial locations depicting the ceiling.

As shown in FIG. 7, in one or more embodiments, the language-guided image-editing system 106 utilizes an image encoder (or sometimes referred to as feature extractor) to encode in image into a visual feature map. For example, in some embodiments, the language-guided image-editing system 106 utilizes a machine learning algorithm (e.g., a neural network) as an image encoder to generate a visual feature map within a space having a number of channels (as dimensions) for the visual features for a height and width. In one or more implementations, the language-guided image-editing system 106 utilizes a machine learning algorithm such as, but not limited to, a convolutional neural network and/or a residual convolutional neural network (e.g., ResNet with various number of layers). Indeed, in one or more instances, the language-guided image-editing system 106 generates a visual feature map $V \in \mathbb{R}^{C_v \times H \times W}$ for a $C_v$ number of channels, a height H, and a width W.

Furthermore, in one or more embodiments, the language-guided image-editing system 106 generates an attention matrix A. In particular, in certain instances, the language-guided image-editing system 106 embeds visual features of a visual feature map V and a natural language embedding $h \in \mathbb{R}^{C_h \times 1}$ within an embedded space (e.g., the same embedded space). Then, in one or more implementations, the language-guided image-editing system 106 utilizes the visual feature map V and the natural language embedding h within the embedded space to generate the attention matrix A. For example, the language-guided image-editing system 106 calculates an attention matrix $A \in \mathbb{R}^{H \times W}$ in accordance with the following function:

$$A = \text{Sigmoid}((W_4 h)^T (W_5 V)) \quad (16)$$

In the above-mentioned function (16), the language-guided image-editing system 106, in some embodiments, utilizes $W_4 \in \mathbb{R}^{C_v \times C_h}$ and $W_4 \in \mathbb{R}^{C_v \times C_v}$ as learnable parameters. For example, the language-guided image-editing system 106 adjusts the learnable parameters to train the CAGAN to calculate an attention matrix that accurately represents degrees of edits at different spatial locations within an image. In one or more embodiments, the language-guided image-editing system 106 utilizes a sigmoid function in the above-mentioned function (16) to normalize (e.g., into a set range of values such as [0,1], [0,10], and/or [0,100]) the weight of degree (e.g., values indicating a degree of editing at various spatial locations). Although a sigmoid function is utilized in the above-mentioned function (16), in some embodiments, the language-guided image-editing system 106 utilizes various normalization functions to normalize the values of an attention matrix A.

Indeed, in one or more implementations, the language-guided image-editing system 106 determines an attention matrix (as described in function (16)) by calculating a multi-modal similarity (from the natural language embedding h and the visual feature map V in the embedded space) that indicates a degree of editing at various locations within an image. For example, the language-guided image-editing system 106 determines a greater degree of editing as a value of the attention matrix increases. For instance, a value of 1 within the attention matrix corresponds to a greater degree of editing within a given location of an image compared to a value of 0.5 within the attention matrix (at another location of the image). Although one or more embodiments illustrate the language-guided image-editing system 106 utilizing an increasing value in the attention matrix as indicating a higher degree of editing, in some embodiments, the language-guided image-editing system 106 utilizes a decreasing value in the attention matrix to indicate a higher degree of editing.

As further shown in FIG. 7, the language-guided image-editing system 106, in some embodiments, represents an attention matrix as an attention map. For instance, the attention map includes a mapping of values (e.g., as a heat map) that indicates different degrees of editing at different spatial locations of an image based on values of an attention matrix. As an example, the language-guided image-editing system 106 utilizes a darker (or greyer) color (or tone) within an attention map at a location of an image that are associated with higher values of an attention matrix (e.g., corresponding to higher degrees of editing). By doing so, in one or more embodiments, the language-guided image-editing system 106 generates an attention map that indicates different amounts of editing at different spatial locations of an image utilizing different grey tones (or another visual characteristic) in the attention map.

Additionally, in one or more embodiments, the language-guided image-editing system 106 expands the natural language embedding h in a spatial dimension. For example, the language-guided image-editing system 106 expands and repeats the natural language embedding h to correspond to a spatial dimension of the attention matrix. In some embodiments, the language-guided image-editing system 106 expands the natural language embedding h into $\bar{h} \in \mathbb{R}^{C_h \times H \times W}$ for a $C_h$ number of channels, a height H, and a width W.

Moreover, in one or more embodiments, the language-guided image-editing system 106 generates a reweighted expanded natural language embedding. In particular, in some embodiments, the language-guided image-editing system 106 reweights elements in an expanded natural language embedding $\bar{h}$ utilizing the attention matrix A to indicate conditional signals for different degrees of editing in a CAGAN. For instance, the language-guided image-editing system 106 reweights the elements of an expanded natural language embedding $\bar{h}$ using an attention matrix A to generate a reweighted expanded natural language embedding $\bar{h}' \in \mathbb{R}^{C_v \times H \times W}$ in accordance with the following function:

$$\bar{h}' = W_6 \bar{h} \odot A \quad (17)$$

In the above-mentioned function (17), the language-guided image-editing system 106 utilizes $W_6 \in \mathbb{R}^{C_v \times C_h}$ as a learnable parameter. For example, the language-guided image-editing system 106 adjusts the learnable parameter to train the CAGAN to generate a reweighted expanded natural language embedding that accurately represents degrees of edits at different spatial locations within an image. Furthermore, in one or more embodiments, the language-guided image-editing system 106 utilizes a Hadamard product (as the notation ⊙).

Then, in some embodiments, the language-guided image-editing system 106 directly models the natural language modification request (via the reweighted expanded natural language embedding) as modulation parameters utilized to modify a visual feature map of an image (e.g., the visual feature map V from FIG. 7). By doing so, in some embodiments, the language-guided image-editing system 106 increases flexibility compared to conventional systems that rely on limited predefined editing operations (e.g., a template). For example, the language-guided image-editing system 106 generates modulation parameters $\gamma \in \mathbb{R}^{C_v \times H \times W}$ and $\beta \in \mathbb{R}^{C_v \times H \times W}$ utilizing the reweighted expanded natural language embedding $\bar{h}'$ in accordance with the following functions:

$$\gamma = W_7 \bar{h}' \quad (18)$$

and $$\beta = W_8 \bar{h}' \quad (19)$$

In the above-mentioned functions (18) and (19), in one or more embodiments, the language-guided image-editing system 106 utilizes learnable convolutional filters $W_7 \in \mathbb{R}^{C_v \times C_v}$ and $W_8 \in \mathbb{R}^{C_v \times C_v}$. In particular, in one or more implementations, the language-guided image-editing system 106 adjusts the learnable convolutional filters to train the CAGAN to generate a modulation parameters that accurately modify a visual feature map to represent degrees of edits at different spatial locations within an image.

Furthermore, in one or more embodiments, the language-guided image-editing system 106 generates a modified visual feature map based on a visual feature map of an image and modulation parameters (e.g., as shown in FIG. 7 and described in relation to functions (18) and (19)). For instance, the language-guided image-editing system 106 generates a modified visual feature map that accounts for different degrees of editing at various spatial locations of an image by scaling and shifting a visual feature map of an image based on the modulation parameters. More specifically, in one or more embodiments, the language-guided image-editing system 106 utilizes the modulation parameters $\gamma$ and $\beta$ (e.g., as described in functions (18) and (19)) to scale and shift a visual feature map $V \in \mathbb{R}^{C_v \times H \times W}$ to generate a modified visual feature map V' in accordance with the following function:

$$V' = \gamma \odot V + \beta \quad (20)$$

In one or more embodiments, the language-guided image-editing system 106 utilizes the CAGAN with the modified visual feature map V' to generate a modified image that reflects modification requests from a natural language modification request with adaptive editing at various spatial locations of an image. In particular, in some implementations, the language-guided image-editing system 106 utilizes the modified visual feature map V' with a decoder of the CAGAN to generate a modified image (e.g., a modified image x̃ in relation to FIG. 7). As suggested above, a modified image generated utilizing a CAGAN and a modified visual feature map of an image that indicates adaptive attention for editing (in accordance with functions (16)-(20)) depicts an image with adaptive edits (from edits requested in a natural language modification request) across different spatial locations within the image.

Additionally, in some embodiments, the language-guided image-editing system 106 utilizes ground truth images that are spatial-adaptive retouched (for specific modification requests) to train the image request attention. In particular, in one or more embodiments, the language-guided image-editing system 106 utilizes the CAGAN with the image request attention to generate a modified image with adaptive editing at various spatial locations of an image based on a natural language modification request (as described above). Then, the language-guided image-editing system 106 compares the modified image to a ground truth image that is spatial-adaptive retouched for the same natural language modification request. Indeed, in some embodiments, the language-guided image-editing system 106 determines various losses described herein (e.g., L1 loss, reconstruction loss, cosine similarities) between the modified image having the different degrees of editing and the ground truth image that is spatial-adaptive retouched (e.g., as supervision). Then, the language-guided image-editing system 106 utilizes the losses (or comparisons) to iteratively learn the various parameters of the image request attention (as utilized in accordance with functions (16)-(20)) such as, but not limited to, the learnable parameters $W_4$, $W_5$, or $W_6$ and/or the learnable convolutional filters $W_7$ or $W_8$ to improve the accuracy of the image request attention.

In addition, although one or more embodiments herein describe the language-guided image-editing system 106 combining various elements (e.g., visual feature maps, natural language embeddings, modulation parameters, learnable parameters) utilizing matrix multiplication, element-wise multiplication, and/or a Hadamard product, the language-guided image-editing system 106, in some embodiments, utilizes various approaches to combine (or merge) the various elements such as, but not limited to, concatenation, multiplication, addition, and/or aggregation. Furthermore, although one or more embodiments herein describe the language-guided image-editing system 106 utilizing particular neural networks, deep learning models, and/or generative adversarial neural network the language-guided image-editing system 106, in some implementations, can utilize various other algorithms (e.g., other implementations of neural networks, deep learning models, generative adversarial neural networks) with the above-described cyclic mechanism, data augmentation approach, and/or image request attention approach.

For example, by utilizing an image request attention approach with the CAGAN (as described above), the language-guided image-editing system 106 generates modified images that accurately modify images with adaptive edits at different spatial locations of an image in response to a natural language modification request. For example, FIG. 8 illustrates real world results of experimenters utilizing an implementation of the language-guided image-editing system to generate a modified image that adaptively incorporates edits to an input image using a CAGAN with the image request attention approach (IRA) even when natural language modification requests are vague (or describe global edits).

Figure 8:
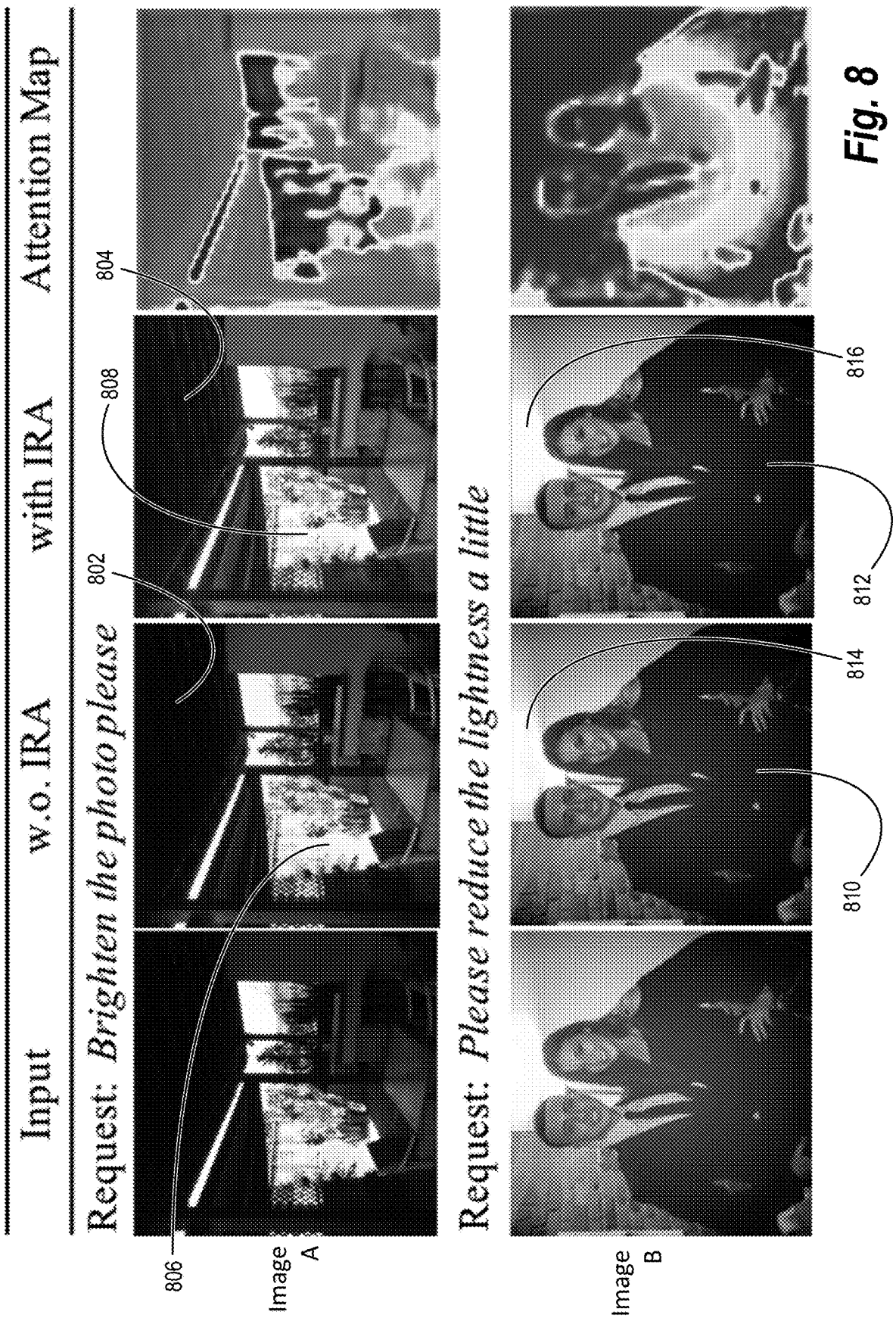
FIG. 8 illustrates example modified image results of a language-guided image-editing system in accordance with one or more implementations.

As shown in FIG. 8, input image A included a natural language modification request "brighten the photo please." An implementation of the language-guided image-editing system 106 without using IRA generated a modified image that increases the brightness in both spatial location 802 and spatial location 806 of the modified image. In contrast, an implementation of the language-guided image-editing system that utilized IRA generated a modified image that increases the brightness greatly in a spatial location 804 while slightly increasing brightness at a spatial location 808 (e.g., adaptive edits). As shown in FIG. 8, the implementation of the language-guided image-editing system that utilized IRA generated an attention map for the image A that indicates different degrees of editing at different spatial locations of the image A.

As further shown in FIG. 8, input image B included a natural language modification request "please reduce the lightness a little." An implementation of the language-guided image-editing system without using IRA generated a modified image that reduced the exposure of image B at spatial location 810 and spatial location 814. In contrast, an implementation of the language-guided image-editing system that utilized IRA generated a modified image that reduces exposure at a spatial location 816 while maintaining the exposure at a spatial location 812. FIG. 8 also illustrates an attention map generated for the image B from the implementation of the language-guided image-editing system that utilized IRA.

As mentioned above, the language-guided image-editing system 106 accurately generates modified images from images and corresponding natural language modification requests. For example, experimenters utilized an implementation of the language-guided image-editing system in accordance with one or more embodiments to compare results with other systems. In order to evaluate results with other systems a redescription similarity score (RSS) is utilized rather than L1 distances and/or manipulative precision (MP).

Quantitative metrics such as L1 distance fail to evaluate a diverse set of edits and also only compare the accuracy of edits between a modified image and a ground truth modified image (not edits in relation to a language modification request). Furthermore, MP as a metric is not suitable for image manipulation through a language editing request because MP evaluates image manipulation and a summarization of the attributes in a target image. In contrast, the RSS measures the accuracy of an image edit in relation to a natural language editing request.

To calculate the RSS, a difference-speaker trained on the same image dataset of the language-guided image-editing system is utilized. In particular, a trained difference-speaker is utilized to generate an editing request $\tilde{t}$ given an input image x and a modified image $\tilde{x}$ (generated utilizing an image editing model). Then, to calculate the RSS, the similarity between the generated editing request $\tilde{t}$ and a ground truth request t (e.g., the text request used with the image editing model) are evaluated. Indeed, the RSS includes semantic similarity evaluation metrics such as BLEU-4, CIDEr, METEOR, and ROUGE-L to evaluate semantic similarity between sentences (e.g., the generated editing request $\tilde{t}$ and the ground truth request t). Indeed, a higher RSS indicates that generated text requests are more semantically similar to ground truth text requests, which means the method (or approach) for the language guided edit is better (e.g., more accurate).

Experimenters trained and utilized various image editing models utilizing a GIER dataset (e.g., having an image, a linguistic request, a target image, and a list of applied editing operations) and a request-augmented MIT-Adobe FiveK aug dataset (e.g., having input-target image pair for image retouching and a linguistic request annotation). The experimenters further compared the language-guided image-editing system implementation to existing language-guided global editing methods PixAug, Operation Modular Network (OMN), GeNeVA, TAGAN, and SISGAN. For a fair comparison, the experimenters added L1 loss for the baseline models which are originally trained on unpaired data. PixAug is described by Wang et al., in Learning to globally edit images with textual description, arXiv preprint arXiv: 1810.05786, 2018. OMN is described by Shi et al., in Expressing Visual Relationships Via Language, In Proceedings of the 57th Annual Meeting of the Association for Computational Linguistics, pages 1873-1883, 2019. GeNeVA is described by El-Nouby et al., in Tell, Draw, and Repeat: Generating and Modifying Images Based on Continual Linguistic Instruction, In Proceedings of the IEEE International Conference on Computer Vision, pages 10304-10312, 2019. TAGAN is described by Nam et al., in Text Adaptive Generative Adversarial Networks: Manipulating Images with Natural Language, In Advances in Neural Information Processing Systems, pages 42-51, 2018. SISGAN is described by Dong et al., in Semantic Image Synthesis Via Adversarial Learning, In Proceedings of the IEEE International Conference on Computer Vision, pages 5706-5714, 2017.

Furthermore, the experimenters also conducted a component analysis by comparing the language-guided image-editing system implementation (CAGAN) to various versions of the language-guided image-editing system without IRA (e.g., w.o. IRA), without the cyclic mechanism and augmentation (e.g., w.o. EDNet), and without data augmentation (e.g., w.o. Aug).

Indeed, the experimenters conducted comparisons using an Inception Score (IS), Fréchet Inception Distance (FID), and the above-mentioned RSS on both the GIER and FiveK datasets. Furthermore, experimenters conducted user studies for comparison. In the user studies, 100 examples from a test set of two datasets were randomly selected and 100 edited images were generated using each method. Given the input image and the request, users were asked to evaluate an image by considering the realism and the consistency between the edited image pairs and their corresponding modification request with rate scores (indicated as "user" in Tables 1 and 2) from 1 (worst) to 5 (best). As shown in Table 1 and Table 2 below, the implementation of the language-guided image-editing system (CAGAN) leads in each evaluation metric. Furthermore, Table 1 and Table 2 further illustrate that the performance of the CAGAN drops without using IRA or EDNet (demonstrating the effectiveness of these components).

TABLE 1

MIT-Adobe FiveK Aug

| | | | RSS↑ | | | | |
|---|---|---|---|---|---|---|---|
| Method | IS↑ | FID↓ | BLEU-4 | CIDEr | METEOR | ROUGE-L | User↑ |
| TAGAN | 12.67 | 60.21 | 8.25 | 63.06 | 10.62 | 21.92 | 1.98 |
| SISGAN | 13.76 | 53.43 | 8.33 | 64.13 | 10.81 | 21.99 | 2.06 |
| GeNeVA | 15.04 | 33.73 | 8.39 | 64.14 | 10.90 | 22.20 | 2.69 |
| PixAug | 15.22 | 34.13 | 8.37 | 64.17 | 10.83 | 22.12 | 2.88 |
| w.o. EDNet | 16.23 | 10.01 | 8.42 | 65.84 | 11.03 | 22.17 | 3.02 |
| w.o. Aug | 16.29 | 10.09 | 8.39 | 65.89 | 11.01 | 22.20 | 3.05 |
| w.o. IRA | 16.93 | 10.12 | 8.53 | 66.13 | 11.07 | 22.65 | 3.12 |
| CAGAN | 17.16 | 9.95 | 8.66 | 66.18 | 11.13 | 22.83 | 3.29 |

TABLE 2

| | | | GIER | | | | |
| --- | --- | --- | --- | --- | --- | --- | --- |
| | | | | RSS↑ | | | |
| Method | IS↑ | FID↓ | BLEU-4 | CIDEr | METEOR | ROUGE-L | User↑ |
| TAGAN | 8.91 | 79.54 | 2.83 | 26.91 | 8.42 | 21.14 | 2.61 |
| SISGAN | 6.57 | 144.61 | 2.43 | 24.02 | 7.60 | 18.43 | 1.79 |
| GeNeVA | 9.70 | 67.70 | 2.76 | 25.49 | 8.34 | 20.94 | 2.55 |
| PixAug | 7.90 | 96.83 | 2.85 | 25.46 | 8.38 | 20.94 | 2.47 |
| OMN | 9.63 | 65.99 | 3.67 | 30.16 | 8.90 | 22.64 | 2.82 |
| w.o. EDNet | 9.83 | 44.88 | 3.79 | 35.73 | 9.15 | 23.14 | 2.93 |
| w.o. Aug | 9.91 | 44.70 | 3.81 | 35.81 | 9.16 | 23.23 | 2.91 |
| w.o. IRA | 10.17 | 42.36 | 3.78 | 36.28 | 9.21 | 23.40 | 3.02 |
| CAGAN | 10.35 | 42.01 | 4.09 | 37.03 | 9.45 | 23.60 | 3.07 |

Figure 9:
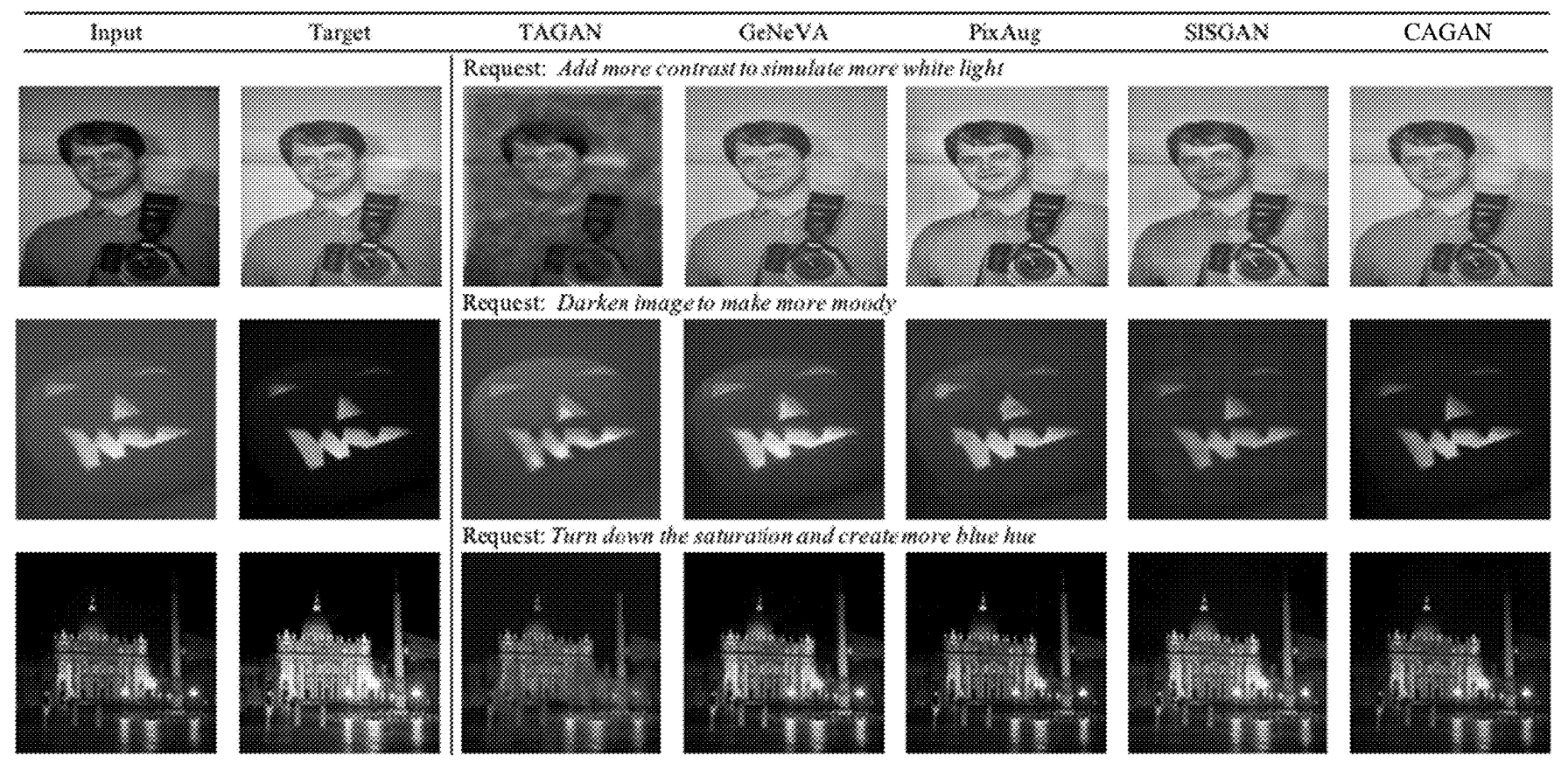
Figure 10:
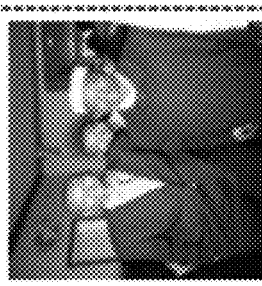
FIG. 10 illustrates comparisons of generating modified images utilizing a language-guided image-editing system without various components of the language-guided image-editing system in accordance with one or more implementations.

In addition, FIG. 9 provides qualitative comparisons between an input image, a target image, and generated modified images from existing language-guided global editing methods and the language-guided image-editing system implementation (CAGAN). As shown in FIG. 9, the language-guided image-editing system implementation (CAGAN) generates modified images in response to a natural language modification request with improved quality and accuracy for various images. Moreover, FIG. 10 provides qualitative comparisons between input images and modified images generated by the language-guided image-editing system implementation (CAGAN) and various versions of the language-guided image-editing system without IRA (e.g., w.o. IRA), without the cyclic mechanism and augmentation (e.g., w.o. EDNet), and without data augmentation (e.g., w.o. Aug) in response to various natural language modification requests. As shown in FIG. 10, by leveraging the editing description neural network (EDNet) and the data augmentation approach, the language-guided image-editing system implementation (CAGAN) using the cross-modal cyclic mechanism with data augmentation is able to darken an image and edit the image to match the natural language request with improved accuracy.

Figure 11:
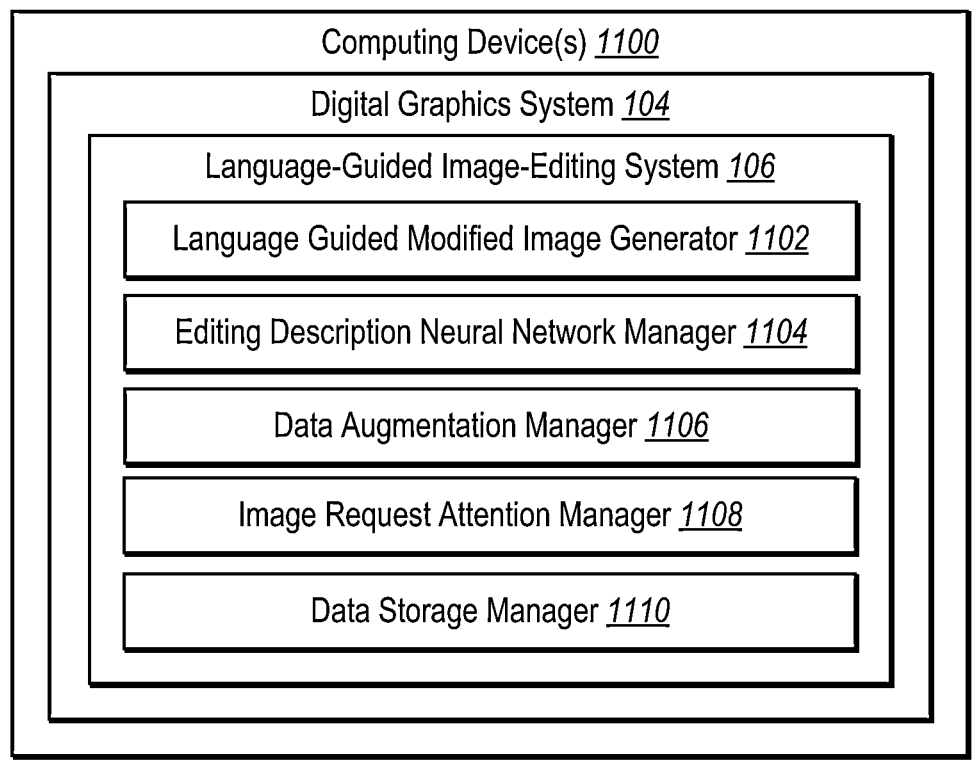
FIG. 11 illustrates a schematic diagram of a language-guided image-editing system in accordance with one or more implementations.

Turning now to FIG. 11, additional detail will be provided regarding components and capabilities of one or more implementations of the language guided image editing system. In particular, FIG. 11 illustrates an example language-guided image-editing system 106 executed by a computing device 1100 (e.g., server device(s) 102 or the client device 110). As shown by the implementation of FIG. 11, the computing device 1100 includes or hosts the digital graphics system 104 and the language-guided image-editing system 106. Furthermore, as shown in FIG. 11, the language-guided image-editing system 106 includes a language guided modified image generator 1102, an editing description neural network manager 1104, a data augmentation manager 1106, an image request attention manager 1108, and a data storage manager 1110.

As just mentioned, and as illustrated in the implementation of FIG. 11, the language-guided image-editing system 106 includes the language guided modified image generator 1102. For instance, the language guided modified image generator 1102 identifies (or receives) an image and a natural language request (e.g., text-based or voice-based) that describes a modification request to the image as described above. In addition, in some implementations, the language guided modified image generator 1102 utilizes the image and a natural language embedding from the natural language request with a cycle augmented generative adversarial neural network (CAGAN) to generate a modified image that reflects the modification request within the natural language request as described above (e.g., in relation to FIGS. 2A and 2B).

Furthermore, as shown in FIG. 11, the language-guided image-editing system 106 includes the editing description neural network manager 1104. In one or more implementations, the editing description neural network manager 1104 utilizes a pair of images (e.g., an image and a modified image) to generate a natural language embedding that describes the transformation between the images as a modification request as described above (e.g., in relation to FIG. 3). In one or more implementations, the editing description neural network manager 1104 generate natural language embeddings as annotation (or ground truth) linguistic embeddings for training data of the CAGAN as described above (e.g., in relation to FIGS. 3 and 4A).

Moreover, as shown in FIG. 11, the language-guided image-editing system 106 includes the data augmentation manager 1106. In some implementations, the data augmentation manager 1106 generates modified variations of an image as training data for the CAGAN as described above. For example, the data augmentation manager 1106 generates modified variations of training data by swapping training images and utilizing an editing description neural network to generate a natural language embedding for the swapped transformation to train the CAGAN as described above (e.g., in relation to FIG. 4B). Furthermore, in some implementations, the data augmentation manager 1106 generates modified variations of training data by utilizing random modifications of a training image and utilizing the editing description neural network to generate a natural language embedding for the randomly modified image(s) to train the CAGAN as described above (e.g., in relation to FIG. 5).

Additionally, as shown in FIG. 11, the language-guided image-editing system 106 includes the image request attention manager 1108. In one or more implementations, the image request attention manager 1108 calculates an attention matrix (from a visual feature map of an image and a natural language embedding) and the visual feature map as described above (e.g., in relation to FIGS. 6 and 7). Moreover, in some implementations, the image request attention manager 1108 utilizes the CAGAN with an attention algorithm based on the attention matrix to generate a modified image that includes an adaptive degree of editing at different spatial locations of the image as described above (e.g., in relation to FIGS. 6 and 7).

In addition, as shown in FIG. 11, the language-guided image-editing system 106 includes the data storage manager 1110. In one or more implementations, the data storage manager 1110 is implemented by one or more memory devices. Furthermore, in some implementations, the data storage manager 1110 maintains data to perform one or more functions of the language-guided image-editing system 106. For example, the data storage manager 1110 includes image data (e.g., images, modified images, varied images, ground truth images), natural language text (e.g., voice based or text based), natural language embeddings (e.g., ground truth natural language embeddings, generated natural language embeddings), components of the CAGAN, components of the editing description neural network, and components of the image request attention module.

Each of the components 1102-1110 of the computing device 1100 (e.g., the computing device 1100 implementing the language-guided image-editing system 106), as shown in FIG. 11, may be in communication with one another using any suitable technology. The components 1102-1110 of the computing device 1100 can comprise software, hardware, or both. For example, the components 1102-1110 can comprise one or more instructions stored on a computer-readable storage medium and executable by processor of one or more computing devices. When executed by the one or more processors, the computer-executable instructions of the language-guided image-editing system 106 (e.g., via the computing device 1100) can cause a client device and/or server device to perform the methods described herein. Alternatively, the components 1102-1110 and their corresponding elements can comprise hardware, such as a special purpose processing device to perform a certain function or group of functions. Additionally, the components 1102-1110 can comprise a combination of computer-executable instructions and hardware.

Furthermore, the components 1102-1110 of the language-guided image-editing system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1102-1110 may be implemented as a stand-alone application, such as a desktop or mobile application. Furthermore, the components 1102-1110 may be implemented as one or more web-based applications hosted on a remote server. The components 1102-1110 may also be implemented in a suite of mobile device applications or "apps." To illustrate, the components 1102-1110 may be implemented in an application, including but not limited to, ADOBE PHOTOSHOP, ADOBE PREMIERE, ADOBE LIGHTROOM, ADOBE ILLUSTRATOR, ADOBE SUBSTANCE, or ADOBE STOCK. The foregoing are either registered trademarks or trademarks of Adobe Inc. in the United States and/or other countries.

Figure 12:
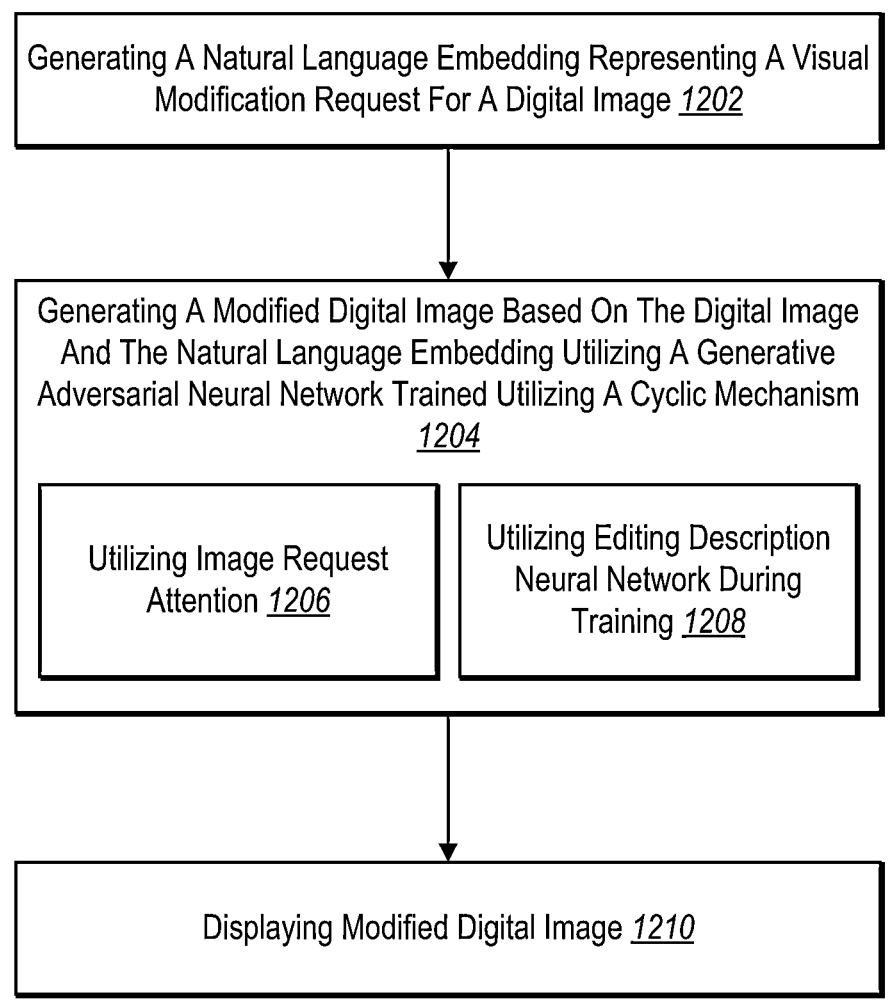
FIG. 12 illustrates a flowchart of a series of acts for generating a modified image from an image based on a natural language modification request utilizing a cycle augmented generative adversarial neural network in accordance with one or more implementations.

FIGS. 1-11, the corresponding text, and the examples provide a number of different methods, systems, devices, and non-transitory computer-readable media of the language-guided image-editing system 106. In addition to the foregoing, one or more implementations can also be described in terms of flowcharts comprising acts for accomplishing a particular result, as shown in FIG. 12. The acts shown in FIG. 12 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 12. In some implementations, a system can be configured to perform the acts of FIG. 12. Alternatively, the acts of FIG. 12 can be performed as part of a computer-implemented method.

FIG. 12 illustrates a flowchart of a series of acts 1200 for generating a modified image from an image based on a natural language modification request utilizing a cycle augmented generative adversarial neural network in accordance with one or more implementations. While FIG. 12 illustrates acts according to one implementation, alternative implementations may omit, add to, reorder, and/or modify any of the acts shown in FIG. 12.

As shown in FIG. 12, the series of acts 1200 include an act 1202 of generating a natural language embedding representing a visual modification request for a digital image. For instance, the act 1202 includes generating a natural language embedding representing a visual modification request from an input natural language text that describes the visual modification request for a digital image. In some embodiments, the act 1202 includes generating an input natural language embedding by utilizing a language encoder and an input natural language text that describes a visual modification request for a digital image. In one or more embodiments, an input natural language text describes multiple visual modification requests for a digital image. Furthermore, in some instances, the act 1202 includes receiving a natural language text from a voice input. In addition, in some embodiments, the act 1202 includes displaying, within a graphical user interface of a client device, a digital image and receiving, from the client device, a natural language text that describes a visual modification request for the digital image. For instance, a visual modification request includes at least one of a request to modify a brightness, a contrast, a hue, a saturation, or a color of a digital image and/or a request to remove an object depicted within the digital image.

As further shown in FIG. 12, the series of acts 1200 include an act 1204 of generating a modified digital image based on the digital image and the natural language embedding utilizing a generative adversarial neural network trained utilizing a cyclic mechanism. For instance, the act 1204 includes generating, utilizing a generative adversarial neural network, a modified digital image reflecting modifications to a digital image indicated in a visual modification request from an input natural language embedding. As further shown in FIG. 12 and as part of the act 1204, the series of acts include an act 1206 of utilizing image request attention and an act 1208 of utilizing an editing description neural network during training (of the generative adversarial neural network) to generate modified digital images utilizing the generative adversarial neural network.

As mentioned above and as shown in FIG. 12, the series of acts includes the act 1206 of utilizing image request attention. In particular, in one or more embodiments, the act 1206 includes generating an attention matrix based on correlations between a visual feature map of a digital image and a natural language embedding (of the digital image). For example, an attention matrix includes an indication of a degree of editing at various locations of a digital image. Furthermore, in some embodiments, the act 1206 includes modifying a visual feature map of a digital image utilizing an expanded natural language embedding that includes reweighted elements based on an attention matrix to generate a modified visual feature map. Moreover, in one or more embodiments, the act 1206 includes generating, utilizing a generative adversarial neural network and based on a modified visual feature map, a modified digital image that includes visual modifications from a visual modification request for a digital image.

In some embodiments, the act 1206 includes generating, utilizing a generative adversarial neural network and based on a modified visual feature map, a modified digital image that includes visual modifications from a visual modification request in different spatial locations of the digital image. In some instances, the act 1206 includes generating, utilizing a generative adversarial neural network and based on a modified visual feature map, a modified digital image to include a first modification of at least one of a brightness, a contrast, a hue, a saturation, a tint, or a color within a digital image at a first spatial location of the digital image and a second modification of the at least one of the brightness, the contrast, the hue, the saturation, the tint, or the color within the digital image at a second spatial location of the digital image.

In some embodiments, the act 1206 includes generating an attention matrix by embedding a visual feature map and a natural language embedding within an embedded space. Furthermore, in one or more embodiments, the act 1206 includes determining reweighted elements of an expanded natural language embedding based on values from an attention matrix that indicate degrees of edits. Additionally, in some embodiments, the act 1206 includes generating one or more modulation parameters utilizing an expanded natural language embedding. In certain instances, the act 1206 further includes generating a modified visual feature map by scaling and shifting a visual feature map of a digital image utilizing one or more modulation parameters. In one or more embodiments, the act 1206 includes adjusting one or more parameters corresponding to an attention matrix based on a loss between a modified digital image and a ground truth digital image comprising visual modifications from a visual modification request in different spatial locations of a digital image.

As mentioned above and as shown in FIG. 12, the series of acts includes the act 1208 of utilizing the editing description neural network during training (of the generative adversarial neural network). For example, the act 1208 includes a generative adversarial neural network that is trained utilizing a cyclic mechanism including multiple variations of a training digital image and an editing description network that outputs natural language embeddings that represent visual changes between digital images. In particular, in some embodiments, the act 1208 includes generating, utilizing a generative adversarial neural network, a modified digital image reflecting modifications to a digital image indicated in a visual modification request from an input natural language embedding. Moreover, in one or more embodiments, the act 1208 includes generating an additional natural language embedding that represents visual changes between a modified digital image and a digital image by utilizing an editing description network that outputs natural language embeddings that represent visual changes between digital images. In addition, in one or more embodiments, the act 1208 includes learning parameters of an editing description network from a comparison between an input natural language embedding and an additional natural language embedding. Moreover, in certain instances, the act 1208 includes learning parameters of a generative adversarial neural network from multiple variations of a digital image and multiple natural language embeddings generated for the multiple variations of the digital image utilizing an editing description network.

In one or more embodiments, the act 1208 includes utilizing an editing description network to model editing operations between a feature map of a modified digital image and a feature map of a digital image to generate an additional natural language embedding. For example, the act 1208 includes generating a feature map of a modified digital image and a feature map of the digital image utilizing an image encoder. Moreover, in some embodiments, the act 1208 includes aligning features of a feature map of a modified digital image and a feature map of a digital image and generating an additional natural language embedding based on a merging of the aligned features.

Furthermore, in some embodiments, the act 1208 includes generating a variation for multiple variations of a digital image by swapping the digital image and a modified digital image to generate, utilizing an editing description network with the digital image and the modified digital image, a variation-based natural language embedding that represents visual changes from the modified digital image to the digital image. Additionally, in some embodiments, the act 1208 includes generating, utilizing a generative adversarial neural network, a variation-based natural language embedding, and a modified digital image, a variation-based modified digital image that mimics a digital image. In addition, in one or more embodiments, that act 1208 includes learning parameters of a generative adversarial neural network based on a comparison between a variation-based modified digital image and a digital image.

Moreover, in some embodiments, the act 1208 includes generating a variation for multiple variations of a digital image by randomly modifying at least one of a brightness, a contrast, a hue, a saturation, a tint, or a color of the digital image to generate a varied-digital image. In certain instances, the act 1208 includes generating, utilizing an editing description network with a digital image and a varied-digital image, a variation-based natural language embedding that represents visual changes from the digital image to the varied-digital image. Furthermore, in some embodiments, the act 1208 includes generating, utilizing a generative adversarial neural network, a variation-based natural language embedding, and a digital image, a variation-based modified digital image that mimics a varied-digital image. In certain instances, the act 1208 includes learning parameters of a generative adversarial neural network utilizing an augmentation loss from a comparison of multiple variations of a digital image and modified digital images generated by the generative adversarial neural network based on multiple natural language embeddings generated for the multiple variations of the digital image.

As further shown in FIG. 12, the series of acts include an act 1210 of displaying a modified digital image. For example, the act 1210 includes displaying, within a graphical user interface of a client device and in response to receiving a natural language text, a modified digital image comprising visual modifications from a visual modification request (based on the natural language text) for a digital image. In particular, in some embodiments, the act 1210 includes displaying a modified image with visual modifications such as, but not limited to, a modified brightness, a modified contrast, a modified hue, a modified saturation, a modified tint, and/or a modified color of a digital image based on a visual modification request. Furthermore, in some embodiments, the act 1210 includes displaying a modified image with a visual modification that removes an object depicted within a digital image based on a visual modification request to remove the depicted object. Additionally, in some embodiments, the act 1210 includes displaying a modified digital image that includes visual modifications from a visual modification request (based on a natural language text) in different spatial locations of a digital image.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 13:
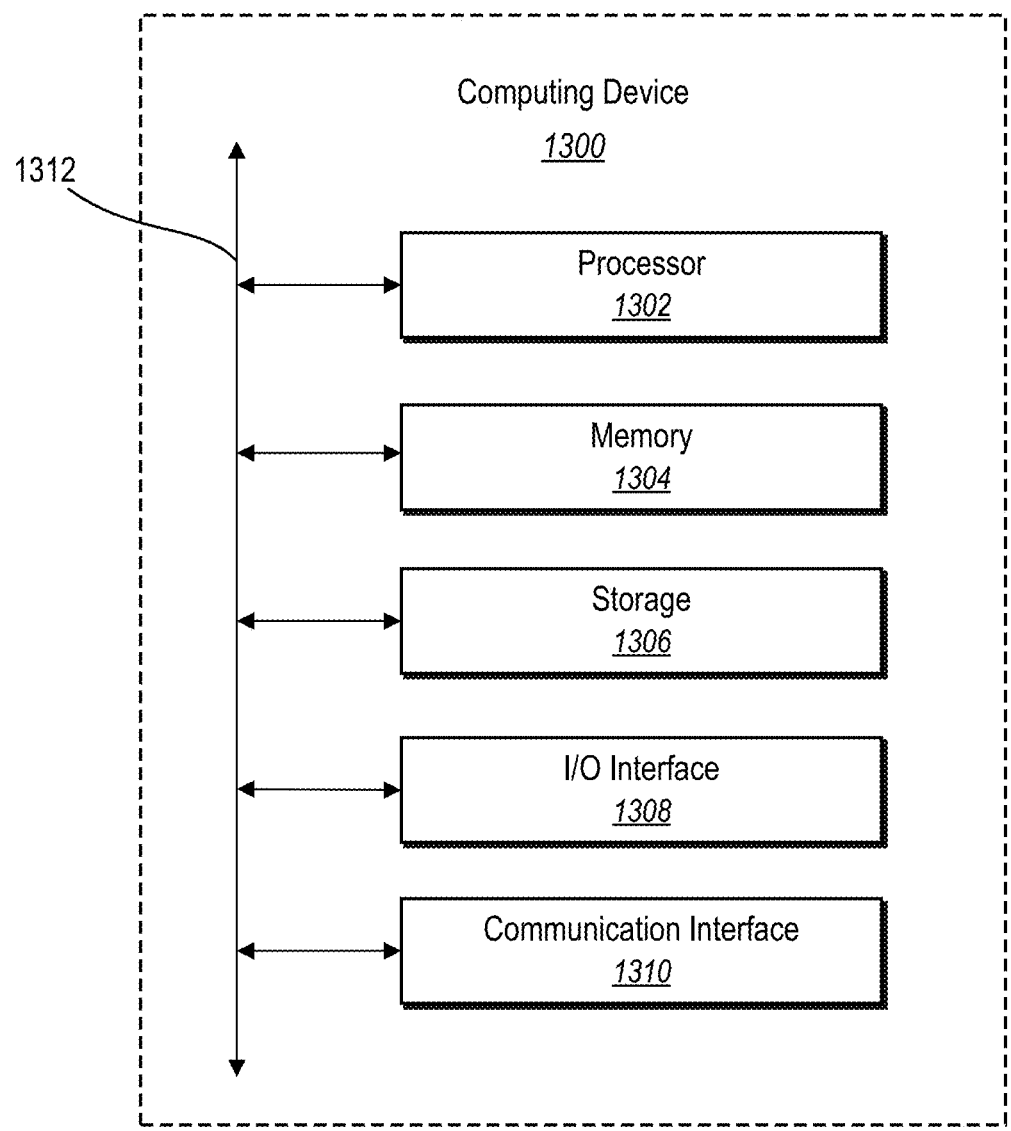
FIG. 13 illustrates a block diagram of an example computing device in accordance with one or more implementations.

FIG. 13 illustrates a block diagram of an example computing device 1300 that may be configured to perform one or more of the processes described above. One will appreciate that one or more computing devices, such as the computing device 1300 may represent the computing devices described above (e.g., computing device 1100, server device(s) 102, and/or client device 110). In one or more implementations, the computing device 1300 may be a mobile device (e.g., a mobile telephone, a smartphone, a PDA, a tablet, a laptop, a camera, a tracker, a watch, a wearable device, etc.). In some implementations, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other implementations. Furthermore, in certain implementations, the computing device 1300 includes fewer components than those shown in FIG. 13. Components of the computing device 1300 shown in FIG. 13 will now be described in additional detail.

In particular implementations, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive ("HDD"), flash memory, a Universal Serial Bus ("USB") drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller ("NIC") or network adapter for communicating with an Ethernet or other wire-based network or a wireless NIC ("WNIC") or wireless adapter for communicating with a wireless network, such as a WI-FI. The computing device 1300 can further include a bus 1312. The bus 1312 can include hardware, software, or both that connects components of computing device 1300 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
   generate a natural language embedding representing a visual modification request from an input natural language text that describes the visual modification request for a digital image;
   generate an attention matrix based on correlations between a visual feature map of the digital image and the natural language embedding, the attention matrix comprising an indication of a degree of editing at various locations of the digital image;
   modify the visual feature map of the digital image utilizing an expanded natural language embedding that comprises reweighted elements based on the attention matrix to generate a modified visual feature map; and
   generate, utilizing a generative adversarial neural network and based on the modified visual feature map, a modified digital image that comprises visual modifications from the visual modification request that vary across one or more spatial locations of the digital image.

2. The non-transitory computer-readable medium of claim 1, further comprising instructions that, when executed by the at least one processor, cause the computing device to generate the attention matrix by embedding the visual feature map and the natural language embedding within an embedded space.

3. The non-transitory computer-readable medium of claim 1, further comprising instructions that, when executed by the at least one processor, cause the computing device to determine the reweighted elements of the expanded natural language embedding based on values from the attention matrix that indicate degrees of edits.

4. The non-transitory computer-readable medium of claim 1, further comprising instructions that, when executed by the at least one processor, cause the computing device to:
generate one or more modulation parameters utilizing the expanded natural language embedding; and
generate the modified visual feature map by scaling and shifting the visual feature map of the digital image utilizing the one or more modulation parameters.

5. The non-transitory computer-readable medium of claim 1,
wherein: the visual modification request comprises a request to modify at least one of a brightness, a contrast, a hue, a saturation, a tint, or a color within the digital image; and
further comprising instructions that, when executed by the at least one processor, cause the computing device to generate, utilizing the generative adversarial neural network and based on the modified visual feature map, the modified digital image to comprise:
a first modification of the at least one of the brightness, the contrast, the hue, the saturation, the tint, or the color within the digital image at a first spatial location of the digital image; and
a second modification of the at least one of the brightness, the contrast, the hue, the saturation, the tint, or the color within the digital image at a second spatial location of the digital image.

6. The non-transitory computer-readable medium of claim 1, further comprising instructions that, when executed by the at least one processor, cause the computing device to adjust one or more parameters corresponding to the attention matrix based on a loss between the modified digital image and a ground truth digital image comprising visual modifications from the visual modification request in different spatial locations of the digital image.

7. A computer-implemented method comprising:
generating, utilizing a generative adversarial neural network, a modified digital image reflecting modifications to a digital image indicated in a visual modification request from an input natural language embedding;
generating an additional natural language embedding that represents visual changes between the modified digital image and the digital image by utilizing an editing description network that outputs natural language embeddings that represent visual changes between digital images;
learning parameters of the editing description network from a comparison between the input natural language embedding and the additional natural language embedding; and
learning parameters of the generative adversarial neural network from multiple variations of the digital image and multiple natural language embeddings generated for the multiple variations of the digital image utilizing the editing description network.

8. The computer-implemented method of claim 7, further comprising generating the input natural language embedding by utilizing a language encoder and an input natural language text that describes the visual modification request for the digital image.

9. The computer-implemented method of claim 7, further comprising utilizing the editing description network to model editing operations between a feature map of the modified digital image and a feature map of the digital image to generate the additional natural language embedding.

10. The computer-implemented method of claim 9, further comprising:
generating the feature map of the modified digital image and the feature map of the digital image utilizing an image encoder;
aligning features of the feature map of the modified digital image and the feature map of the digital image; and
generating the additional natural language embedding based on a merging of the aligned features.

11. The computer-implemented method of claim 7, further comprising generating a variation for the multiple variations of the digital image by swapping the digital image and the modified digital image to:
generate, utilizing the editing description network with the digital image and the modified digital image, a variation-based natural language embedding that represents visual changes from the modified digital image to the digital image;
generate, utilizing the generative adversarial neural network, the variation-based natural language embedding, and the modified digital image, a variation-based modified digital image that mimics the digital image; and
learn the parameters of the generative adversarial neural network based on a comparison between the variation-based modified digital image and the digital image.

12. The computer-implemented method of claim 7, further comprising generating a variation for the multiple variations of the digital image by randomly modifying at least one of a brightness, a contrast, a hue, a saturation, a tint, or a color of the digital image to generate a varied-digital image.

13. The computer-implemented method of claim 12, further comprising:
generating, utilizing the editing description network with the digital image and the varied-digital image, a variation-based natural language embedding that represents visual changes from the digital image to the varied-digital image;
generating, utilizing the generative adversarial neural network, the variation-based natural language embedding, and the digital image, a variation-based modified digital image that mimics the varied-digital image; and
learning the parameters of the generative adversarial neural network based on a comparison between the variation-based modified digital image and the varied-digital image.

14. The computer-implemented method of claim 7, further comprising learning parameters of the generative adversarial neural network utilizing an augmentation loss from a comparison of the multiple variations of the digital image and modified digital images generated by the generative adversarial neural network based on the multiple natural language embeddings generated for the multiple variations of the digital image.

15. A system comprising:
one or more memory devices comprising:
a digital image;
an input natural language text that describes a visual modification request for the digital image; and a generative adversarial neural network; and one or more processors configured to cause the system to:

generate a visual feature map for the digital image;

generate a modified visual feature map by modifying the visual feature map of the digital image utilizing an expanded natural language embedding from the input natural language text that comprises reweighted elements based on an attention matrix, the attention matrix comprising an indication of a degree of editing at various locations of the digital image; and generate, utilizing the generative adversarial neural network and based on the modified visual feature map, a modified digital image comprising visual modifications from the visual modification request for the digital image.

16. The system of claim 15, wherein the one or more processors are configured to cause the system to generate the modified digital image to comprise different visual modifications in different spatial locations of the digital image.

17. The system of claim 15, wherein the generative adversarial neural network is trained utilizing a cyclic mechanism comprising multiple variations of a training digital image and an editing description network that outputs natural language embeddings that represent visual changes between digital images.

18. The system of claim 15, wherein the one or more processors are configured to cause the system to receive the natural language text from a voice input.

19. The system of claim 15, wherein the one or more processors are configured to:

display, within a graphical user interface of a client device, the digital image;

receive, from the client device, the natural language text that describes the visual modification request for the digital image; and display, within the graphical user interface of the client device and in response to receiving the natural language text, the modified digital image comprising the visual modifications from the visual modification request for the digital image.

20. The system of claim 15, wherein the visual modification request comprises:

at least one of a request to modify a brightness, a contrast, a hue, a saturation, a tint, or a color of the digital image; or a request to remove an object depicted within the digital image.

* * * * *